(12) United States Patent
Nguyen

(10) Patent No.: US 9,825,794 B2
(45) Date of Patent: Nov. 21, 2017

(54) WEAK SIGNAL DETECTION IN DOUBLE TRANSMISSION

(71) Applicant: Thuy Duong Nguyen, Muehlheim am Main (DE)

(72) Inventor: Thuy Duong Nguyen, Muehlheim am Main (DE)

( * ) Notice: Subject to any disclaimer, the term of this patent is extended or adjusted under 35 U.S.C. 154(b) by 0 days.

(21) Appl. No.: 14/900,940

(22) PCT Filed: Jun. 25, 2014

(86) PCT No.: PCT/IB2014/002319
§ 371 (c)(1),
(2) Date: Dec. 22, 2015

(87) PCT Pub. No.: WO2015/008165
PCT Pub. Date: Jan. 22, 2015

(65) Prior Publication Data
US 2016/0142236 A1    May 19, 2016

(30) Foreign Application Priority Data
Jun. 25, 2013    (EP) ..................................... 13173671

(51) Int. Cl.
*H04L 27/26* (2006.01)
*H04L 27/06* (2006.01)
*H04L 27/38* (2006.01)
*H04L 29/08* (2006.01)

(52) U.S. Cl.
CPC .......... *H04L 27/265* (2013.01); *H04L 27/066* (2013.01); *H04L 27/2657* (2013.01); *H04L 27/38* (2013.01); *H04L 67/12* (2013.01)

(58) Field of Classification Search
CPC ......................... H04L 27/265; H04L 27/2657
USPC ......................................................... 375/260
See application file for complete search history.

(56) References Cited

U.S. PATENT DOCUMENTS

| | | | | |
|---|---|---|---|---|
| 5,603,088 A | * | 2/1997 | Gorday | ................ H04B 17/309 340/7.24 |
| 2003/0206577 A1 | * | 11/2003 | Liberti, Jr. | ......... H04B 1/71055 375/152 |
| 2010/0054352 A1 | | 3/2010 | Huttunen et al. | |
| 2010/0067570 A1 | * | 3/2010 | Lipp | ....................... H03D 1/00 375/228 |
| 2014/0167734 A1 | | 6/2014 | Detert | |
| 2016/0149737 A1 | * | 5/2016 | Detert | .................... H04L 27/06 375/224 |

FOREIGN PATENT DOCUMENTS

DE    10 2011 080 999 A1    2/2013

OTHER PUBLICATIONS

International Search Report corresponding to PCT/IB2014/002319, dated Feb. 20, 2015, 3 pages.
(Continued)

*Primary Examiner* — Michael Neff
(74) *Attorney, Agent, or Firm* — Lewis Roca Rothgerber Christie LLP

(57) ABSTRACT

Disclosed is a method for the detection of more than one signals contained in a receive signal, the method comprising: down-converting the receive signal, thereby providing a down-converted signal in a complex IQ base band; at least partially cancelling the strongest user in the down-converted signal, thereby allowing for the detection of a possible secondary user.

14 Claims, 4 Drawing Sheets

(56) References Cited

OTHER PUBLICATIONS

Whalen, "Detection of Signals in Noise," Academic Press, N.Y., 1971, 418 pages.
Kay, "A Fast and Accurate Single Frequency Estimator," IEEE Transactions on Acoustics, Speech, and Signal Processing, vol. 37, No. 12, Dec. 1989, pp. 1987-1990.
Schoukens, et al., "The interpolated Fast Fourier Transform: A Comparative Study," IEEE Transaction on Instrumentation and Measurement, vol. 41, No. 2, Apr. 1992, pp. 226-232.
Umesh, et al., "Computationally Efficient Estimation of Sinusoidal Frequency At Low SNR," Proceedings of the 1996 IEEE International Conference on Acoustics Speech and Signal Processing, Atlanta (GA), 1996, 4 pages.
Martin, "Noise Power Spectral Density Estimation Based on Optimal Smoothing and Minimum Statistics," IEEE Transaction on speech and audio processing, vol. 9, No. 5, Jul. 2001, pp. 504-512.
Stoica, et al., "Spectral Analysis of Signals," Prentice Hall, Upper Saddle River, New Jersey, 2005, 447 pages.
Deneufchâtel, et al., "Annex 10 amendments to cover Climax operation on DSB-AM with 8.33kHz channel spacing", Aeronautical Communications Panel (ACP), Working Group M (ACP WG-M), Montreal, Canada, 2006, 7 pages.
Electromagnetic compatibility and Radio spectrum Matters (ERM); Ground-based VHF hand-held, mobile and fixed radio transmitters, receivers and transceivers for the VHF aeronautical mobile service using amplitude modulation; Part 1: Technical characteristics and methods of measurement, ETSI EN 300 676-1 V1.4.1, Apr. 2007, 43 pages.
Annex 10 to the Convention on International Civil Aviation Aeronautical Telecommunications, vol. III, 2nd edition 2007, part 2: voice communications systems, including amendment 85, Jul. 2007, 254 pages.
Yang, "A Study of the Inverse Short Fourier Transform," Proc. Acoustics, Speech and Signal Processing, 2008. ICASSP 2008. IEEE International Conference on, pp. 3541-3544, Mar. 31, 2008-Apr. 4, 2008.

\* cited by examiner

US 9,825,794 B2

WEAK SIGNAL DETECTION IN DOUBLE TRANSMISSION

CROSS-REFERENCED TO RELATED APPLICATION(S)

This Application is a National Phase Patent Application and claims priority to and the benefit of International Application Number PCT/IB2014/002319, filed on Jun. 25, 2014, which claims priority to and the benefit of European Patent Application No. EP13173671.2, filed Jun. 25, 2013, the entire contents of all of which are incorporated herein by reference.

FIELD OF INVENTION

The present invention relates to the field of signal transmission and in particular transmission of signals by different users on the same carrier at the same time.

BACKGROUND

In the transmission of signals (e.g. voice signals) it is known to have U users that transmit at the same time on the same nominal carrier frequency $f_{carrier}$, causing a so-called double transmission if $U \geq 2$. These U users correspond to U mobile or fixed stations, which transmit respective signals e.g. Double Side-Band full carrier Amplitude Modulated (DSB-AM) voice signals, termed A3E following ITU modulation code.

1 Summary

Double transmissions are a problem especially in Air Traffic Control (ATC) if they remain undetected, because only the strongest signal is perceived by the other side, the remaining signals might be overheard.

In view of the above-described situation, there exists a need for an improved technique that enables to cope with double transmission, while substantially avoiding or at least reducing one or more of the above-identified problems.

This need may be met by the subject matter according to the independent claims. Advantageous embodiments of the herein disclosed subject matter are described by the dependent claims.

According to an embodiment of a first aspect of the herein disclosed subject matter there is provided a method for the detection of more than one signal contained in a receive signal, the method comprising: down-converting the receive signal, thereby providing a down-converted signal in a complex IQ base band; at least partially cancelling the strongest user (user signal) in the down-converted signal, thereby allowing for the detection of a possible secondary user (secondary user signal).

According to an embodiment of a second aspect of the herein disclosed subject matter, there is provided a method of detecting CLIMAX signals, e.g. by detection of the spectral peaks caused by a carrier (e.g. a DSB-AM carrier), e.g. as described in chapter 5.1.

According to an embodiment of a third aspect a computer program product is provided, e.g. in the form of a program element or a computer readable medium comprising a program element, the program product (in particular the program element) being adapted for carrying out, when running on a processor device, the method according to the first aspect or an embodiment thereof.

According to an embodiment of a fourth aspect a receiver of a communication system is provided, the receiver comprising a controller being adapted for carrying out the method according to the first aspect or an embodiment thereof.

According to an embodiment of a fifth aspect a communication system is provided, the communication system comprising a receiver according to the fourth aspect or an embodiment thereof.

According to embodiments of the first aspect, the method is adapted for providing the functionality of one or more of the herein disclosed embodiments and/or for providing the functionality as required by one or more of the herein disclosed embodiments, in particular of the embodiments of the second, third, fourth and fifth aspect.

According to embodiments of the second aspect, the method is adapted for providing the functionality of one or more of the herein disclosed embodiments and/or for providing the functionality as required by one or more of the herein disclosed embodiments, in particular of the embodiments of the first, third, fourth and fifth aspect.

According to embodiments of the third aspect, the computer program is adapted for providing the functionality of one or more of the herein disclosed embodiments and/or for providing the functionality as required by one or more of the herein disclosed embodiments, in particular of the embodiments of the first, second, fourth and fifth aspect.

According to embodiments of the fourth aspect, the receiver is adapted for providing the functionality of one or more of the herein disclosed embodiments and/or for providing the functionality as required by one or more of the herein disclosed embodiments, in particular of the embodiments of the first, second, third and fifth aspect.

According to embodiments of the fifth aspect, the communication system is adapted for providing the functionality of one or more of the herein disclosed embodiments and/or for providing the functionality as required by one or more of the herein disclosed embodiments, in particular of the embodiments of the first, second, third and fourth aspect.

Generally herein, a reference to a user is intended to include a reference to a user signal and vice versa and is used to enhance clarity. For instance, a reference to "the strongest user" includes a reference to "the strongest user signal" and a reference to "a secondary user" includes a reference to "a secondary user signal".

In the following, exemplary embodiments of the herein disclosed subject matter are described, any number and any combination of which may be realized in an implementation of the herein disclosed subject matter.

As used herein, reference to a program element is intended to include a reference to a set of instructions for controlling a computer system to effect and/or coordinate the performance of the respective method.

The computer program may be implemented as computer readable instruction code by use of any suitable programming language, such as, for example, JAVA, C++, and may be stored on a computer-readable medium (removable disk, volatile or non-volatile memory, embedded memory/processor, etc.). The instruction code is operable to program a computer or any other programmable device to carry out the intended functions. The computer program may be available from a network, such as the World Wide Web, from which it may be downloaded.

The herein disclosed subject matter may be realized by means of a computer program respectively software. However, the herein disclosed subject matter may also be realized by means of one or more specific electronic circuits respectively hardware. Furthermore, the herein disclosed subject matter may also be realized in a hybrid form, i.e. in a combination of software modules and hardware modules.

In the above there have been described and in the following there will be described exemplary embodiments of the subject matter disclosed herein with reference to methods, a computer program product, a receiver and a communication system. It has to be pointed out that of course any combination of features relating to different aspects of the herein disclosed subject matter is also possible. In particular, some features have been or will be described with reference to apparatus type embodiments whereas other features have been or will be described with reference to method type embodiments. However, a person skilled in the art will gather from the above and the following description that, unless other notified, in addition to any combination of features belonging to one aspect also any combination of features relating to different aspects or embodiments, for example even combinations of features of apparatus type embodiments and features of the method type embodiments are considered to be disclosed with this application.

The aspects and embodiments defined above and further aspects and embodiments of the herein disclosed subject matter are apparent from the examples to be described hereinafter and are explained with reference to the drawings, but to which the invention is not limited.

DETAILED DESCRIPTION

Figure 1:
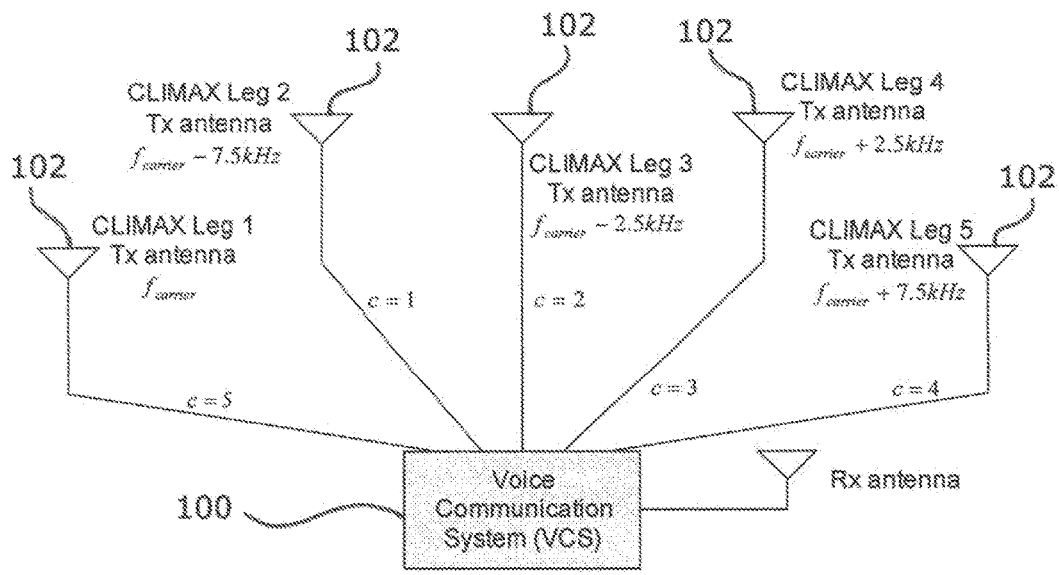
FIG. 1 shows an example of a five leg CLIMAX configuration with a voice communication system (VCS) and transmit (Tx) antennas.

The illustration in the drawings is schematic. It is noted that in different figures, similar or identical elements are provided with the same reference signs or with reference signs. In such cases a repeated description is avoided for the sake of brevity.

Embodiments of the herein disclosed subject matter is based on the idea to make the detection of the overheard signals possible by detecting their occurrence, making a signaling by an appropriate means (audio-tone, visually or similar) to the operator feasible.

A mobile station might be e.g. an aircraft or a mobile ground station. A fixed station is always a ground radio. Whereas fixed ground stations often have a single transmitter, if so-called CLIMAX transmission is used a fixed ground station as a single user even sends multiple spectrally shifted copies of its transmit signal using multiple transmitters. This further complicates the detection problem, because the multiple transmissions by one user can be confused with multiple users. This CLIMAX detection problem is also solved by embodiments of the herein disclosed subject matter.

In addition, it might be useful to detect as to whether a double transmission is caused by (at least) two airborne users or a transmission including a ground station. This is highlighted in chapter 6.

In the following there is described an exemplary signal model, detection schemes for detecting double transmissions and statistical considerations in accordance with embodiments of the herein disclosed subject matter.

2 Signal Model 2.1 Transmit Signal of Mobile Users and Fixed Users

Each transmitting user u has his voice signal $s^{(u)}(t)$ multiplied by a real-valued positive modulation index in $m^{(u)}$, and then a real-valued constant added. This constant results in an unmodulated carrier component that adds to the AM-modulated carrier, which is modulated by $m^{(u)} \cdot s^{(u)}(t)$:

$$(1 + m^{(u)} \cdot s^{(u)}(t)) \cdot \cos(2 \cdot \pi \cdot f_{carrier,Tx}^{(u)} \cdot t + \phi_{Tx}^{(u)}) = \quad (2.1)$$

$$\underbrace{1 \cdot \cos(2 \cdot \pi \cdot f_{carrier,Tx}^{(u)} \cdot t + \phi_{Tx}^{(u)})}_{unmodulated\ carrier} +$$

$$\underbrace{m^{(u)} \cdot s^{(u)}(t) \cdot \cos(2 \cdot \pi \cdot f_{carrier,Tx}^{(u)} \cdot t + \phi_{Tx}^{(u)})}_{modulated\ carrier}.$$

The $m^{(u)}$ are the individual modulation indices of the users u, u=1, 2, ..., U. The modulation index $m^{(u)}$ is normally chosen to be around approximately 0.8 or higher, but below 1 to prevent overmodulation. The nominal carrier frequency $f_{carrier}$ used for transmission is not exactly met due to hardware deviations, but is closely approximated by the actual carrier frequency of user u, which is denoted $f_{carrier,Tx}^{(u)}$. The Radio Frequency (RF) signal also has a carrier phase $\phi_{Tx}^{(u)}$. An RF amplifier with real-valued amplification $P_{NL}^{(u)}\{\cdot\}$ provides the necessary transmit power, where NL denotes the non-linearity of the operator.

The transmit signal of each user u can be written $$x_{NL}^{(u)}(t) = P_{NL}^{(u)}\{(1+m^{(u)} \cdot s^{(u)}(t)) \cdot \cos(2 \cdot \pi \cdot f_{carrier,Tx}^{(u)} \cdot t + \phi_{Tx}^{(u)})\},\ u=1,2,\ldots U. \quad (2.2)$$

The memoryless nonlinearity $P_{NL}^{(u)}\{\cdot\}$ has two effects on the signal to be transmitted. On the one hand, the amplitude of the transmit signal is distorted. This effect is termed AM-to-AM conversion and can be described by an operator $P_{AM}^{(u)}\{\cdot\}$ working on the amplitude. On the other hand, the transmit signal is distorted in its phase. This effect is termed AM-to-PM conversion and is described by the operator $P_{PM}^{(u)}\{\cdot\}$ distorting the phase. The resulting transmit signal of user u can be written $$x_{NL}^{(u)}(t) = P_{AM}^{(u)}\{(1+m^{(u)} \cdot s^{(u)}(t))\} \cdot \cos(2 \cdot \pi f_{carrier,Tx}^{(u)} \cdot t + \phi_{Tx}^{(u)} + P_{PM}^{(u)}\{(1+m^{(u)} \cdot s^{(u)}(t))\}). \quad (2.3)$$

AM-to-AM conversion is not a problem, when the non-linearity is memoryless: It just leads to a different scaling of the transmit signal. AM-to-PM conversion, however, leads to a loss of the property of the phase corrected transmit signal to be conjugate symmetric about the carrier frequency. In practice, a non-linearity can often be ignored.

Therefore, we drop the subscript NL for the nonlinearity, and assume a linear real-valued amplification by a factor $P^{(u)}$. Therefore, the transmit signal can be written $$x^{(u)}(t) = P^{(u)} \cdot (1+m^{(u)} \cdot s^{(u)}(t)) \cdot \cos(2 \cdot \pi f_{carrier,Tx}^{(u)} \cdot t + \phi_{Tx}^{(u)}). \quad (2.4)$$

Thus, we ignore the AM-to-AM and AM-to-PM conversion, deal with Equation (2.4) instead of Equation (2.2) and Equation (2.3) in the following, and mention the non-linear distortion only when necessary.

2.2 CLIMAX Transmission and Cross Coupled Mode

CLIMAX, also termed "off-set carrier operation" or simply multicarrier operation, is a ground-to-air voice communication solution that extends the coverage of the DSB-AM VHF voice communications by simultaneous transmission using multiple transmitters. There are different Multicarrier/CLIMAX-modes that may be used by a ground station. FIG. 1 shows an example of a five leg CLIMAX configuration with a voice communication system (VCS) 100 and transmit (Tx) antennas 102.

The term leg denotes one of the C paths to the antennas 102, each leg indexed by c, with c=1, ..., C. There are C=5 antennas 102 in this example, each with its own transmitter, hence it is termed 5-carrier CLIMAX. In other embodiments, other numbers of antennas are provided. In each specific CLIMAX-mode, there is a set of fixed offset frequencies from the nominal carrier frequency $f_{carrier}$. Each offset frequency is assigned to another transmitter transmitting the same voice signal $s^{(u_{CLIMAX})}(k)$, i.e. the voice signal of the user $u_{CLIMAX}$ using this CLIMAX mode. This offset allows for preventing the degradation in speech intelligibility from heterodynes. Thus, each CLIMAX-mode is characterized by the spectrally shifted copies of the same voice signal $s^{(u_{CLIMAX})}(k)$ it is made up from. Each copy is transmitted by another transmitter at a different location in order to extend the coverage. Thus, in case of a ground station that uses CLIMAX transmission, there are even multiple copies of the same voice signal, transmitted over geographically separated antennas in order to improve coverage. These signal copies have a frequency offset so that the mobile radio can capture the strongest signal copy and its voiced sidebands, the weaker signal copies are typically filtered out in the mobile user's radio e.g. by a Phase Locked Loop (PLL). Thus, these multiple copies of the same signal correspond to only a single user, and must not be confused with the case when there are signals from different users. When CLIMAX is not active, we speak of the non-CLIMAX case.

CLIMAX offers various degrees of freedom on how the carrier offsets might be chosen. The following Table 2.1 lists some possible setups for 25 kHz, 50 kHz and 100 kHz channel space environments. Details can be found in ANNEX 10 to the Convention on International Civil Aviation Aeronautical Telecommunications, Volume III, $2^{nd}$ edition 2007, part 2: voice communications systems, including amendment 85 (referred to as [ANNEX10] in the following).

TABLE 2.1

Examples of possible carrier frequency offsets for 25 kHz, 50 kHz and 100 kHz channel space environments according to [ANNEX10].

| # of CLIMAX legs | Leg 1 Tx frequency | Leg 2 Tx frequency | Leg 3 Tx frequency | Leg 4 Tx frequency | Leg 5 Tx frequency |
|---|---|---|---|---|---|
| 2 | $f_{carrier}$ + 5 kHz | $f_{carrier}$ − 5 kHz | N/A | N/A | N/A |
| 3 | $f_{carrier}$ + 7.3 kHz | $f_{carrier}$ | $f_{carrier}$ − 7.3 kHz | N/A | N/A |
| 4 | $f_{carrier}$ + 7.5 kHz | $f_{carrier}$ − 7.5 kHz | $f_{carrier}$ + 2.5 kHz | $f_{carrier}$ − 2.5 kHz | N/A |
| 5 | $f_{carrier}$ | $f_{carrier}$ − 7.5 kHz | $f_{carrier}$ − 2.5 kHz | $f_{carrier}$ + 2.5 kHz | $f_{carrier}$ + 7.5 kHz |

For 8.33 kHz channel space environments, the carrier frequency offsets have been proposed by Luc Deneufchâtel and Jacky Pouzet in "Annex 10 amendments to cover Climax operation on DSB-AM with 8.33 kHz channel spacing", AERONAUTICAL COMMUNICATIONS PANEL (ACP), Working Group M (ACP WG-M), Montreal, Canada, 2006 (hereinafter referred to as [ANNEX10prop]) and shown in Table 2.2. Meanwhile, they are adopted in [ANNEX10].

settings stated in Table 2.1 and Table 2.2 can be generalized as in the following Table 2.3.

TABLE 2.3

Generalization of [ANNEX10] in terms of possible carrier frequency offsets, e.g. $f_{carrier} + \Delta f_{CLIMAX,2}^{(2)}$ means the second carrier of 2 carrier CLIMAX, and, e.g. $f_{carrier} + \Delta f_{CLIMAX,1}^{(3)}$ means the first carrier of 3 carrier CLIMAX.

| # of CLIMAX legs | Leg 1 Tx frequency | Leg 2 Tx frequency | Leg 3 Tx frequency | Leg 4 Tx frequency | Leg 5 Tx frequency |
|---|---|---|---|---|---|
| 2 | $f_{carrier} + \Delta f_{CLIMAX,2}^{(2)}$ | $f_{carrier} + \Delta f_{CLIMAX,1}^{(2)}$ | N/A | N/A | N/A |
| 3 | $f_{carrier} + \Delta f_{CLIMAX,2}^{(3)}$ | $f_{carrier} + \Delta f_{CLIMAX,3}^{(3)}$ with $\Delta f_{CLIMAX,3}^{(3)} = 0$ | $f_{carrier} + \Delta f_{CLIMAX,1}^{(3)}$ | N/A | N/A |
| 4 | $f_{carrier} + \Delta f_{CLIMAX,4}^{(4)}$ | $f_{carrier} + \Delta f_{CLIMAX,1}^{(4)}$ | $f_{carrier} + \Delta f_{CLIMAX,3}^{(4)}$ | $f_{carrier} + \Delta f_{CLIMAX,2}^{(4)}$ | N/A |
| 5 | $f_{carrier} + \Delta f_{CLIMAX,5}^{(5)}$ with $\Delta f_{CLIMAX,5}^{(5)} = 0$ | $f_{carrier} + \Delta f_{CLIMAX,1}^{(5)}$ | $f_{carrier} + \Delta f_{CLIMAX,2}^{(5)}$ | $f_{carrier} + \Delta f_{CLIMAX,3}^{(5)}$ | $f_{carrier} + \Delta f_{CLIMAX,4}^{(5)}$ |

TABLE 2.2

Possible carrier frequency offset for 8.33 kHz channel space environments according to [ANNEX10prop].

| # of CLIMAX legs | Leg 1 Tx frequency | Leg 2 Tx frequency | Leg 3 Tx frequency | Leg 4 Tx frequency | Leg 5 Tx frequency |
|---|---|---|---|---|---|
| 2 | $f_{carrier}$ + 2.5 kHz | $f_{carrier}$ − 2.5 kHz | N/A | N/A | N/A |

The frequency offsets are chosen such as to prevent or diminish heterodynes present within the received speech signal. Independent of the channel space environments, the In Table 2.3, $\Delta f_{CLIMAX,c}^{(C)}$ is the c-th CLIMAX offset of a C-carrier CLIMAX signal. E.g. for C=5-carrier CLIMAX, the offsets are $$\{\Delta f_{CLIMAX,c}^{(5)}\}_{c=1}^{5} = \{\Delta f_{CLIMAX,1}^{(5)}, \Delta f_{CLIMAX,2}^{(5)}, \Delta f_{CLIMAX,3}^{(5)}, \Delta f_{CLIMAX,4}^{(5)}, \Delta f_{CLIMAX,5}^{(5)}(=0)\}. \quad (2.5)$$

The index c that determines a specific CLIMAX offset runs from the lowest to the highest frequency, excluding the middle carrier zero frequency offset if it exists (it exists only for 3-carrier and 5-carrier CLIMAX). If the middle carrier located at zero frequency offset exists, it has the index c=C, which is uneven in this case. E.g. for 3-carrier CLIMAX, c=C=3.

In case of a ground station that uses cross-coupling, the operator's DSB-AM signal is retransmitted in another sector by the nominal carrier frequency $f_{carrier}$ in that sector. The retransmission in a certain sector might lead to a double transmission in the same way as an ordinary transmission by the operator in that same sector would do. Therefore, cross-coupling poses the same problem to the detector as an ordinary transmission from a ground station which is intended for that same sector. Thus, cross-coupling is included in the signal model used here. To sum up, the detector has no need to judge between original transmissions and retransmissions using cross-coupling.

2.3 Received Signal

According to an embodiment, the U users are received via receive antennas that are only used for signal reception, the transmit antennas are often located elsewhere. Often, only a single receive antenna is used. The received RF signal of each receive antenna is down-converted to the baseband. This down-conversion can be done either by analog mixing, including an optional intermediate frequency, followed by digital down-conversion, or also directly from RF to baseband, followed by analogue-to-digital conversion in the baseband, or in another fashion. Because the users' DSB-AM signals are in general received on different frequencies on the receiver side due to hardware oscillator errors and Doppler, the conversion to baseband can in general not compensate all carrier frequencies at the same time. The demodulation can either be done by the nominal carrier frequency, or, if an automatic demodulation is done e.g. by a Phase Locked Loop (PLL), by a resulting carrier frequency on which the PLL locks, which is usually the strongest received DSB-AM carrier in the receive signal mixture. In any case, in the complex IQ baseband, each user then has a different remaining frequency offset $\Delta f^{(u)}$ and phase offset $\phi^{(u)}$ after conversion to IQ baseband. No matter how the demodulation and sampling is performed, the resulting signal is in general complex-valued in the baseband, it has an inphase (I) and a quadrature (Q) component.

It is possible to write the received signal in complex baseband of the sum of three terms: The first term is a sum of all possibly transmitted non-CLIMAX receive signals, so mobile users as well as non-CLIMAX ground stations. The second term contains the sum of all possibly transmitted CLIMAX signals including a possible middle carrier close to zero frequency in complex baseband (3-carrier and 5-carrier CLIMAX). The third term contains the noise.

One can also include a possible CLIMAX middle carrier close to zero in the first sum, and drop it from the second sum. The reason is that a CLIMAX middle carrier close to zero frequency on its own cannot easily be distinguished from an ordinary ground station or mobile user, if its statistically smaller frequency error is not considered.

With this absorption of a possibly transmitted CLIMAX middle carrier close to zero frequency, the equivalent baseband signal to the analogue RF signal is then represented by the analogue complex IQ-baseband signal r(t), given as $$r(t) = \sum_{u=1}^{U} (1 + m^{(u)} \cdot s^{(u)}(t)) \cdot a^{(u)} \cdot e^{j\cdot\phi^{(u)}} \cdot e^{j\cdot 2\pi\cdot\Delta f^{(u)}\cdot t} + \sum_{c=1}^{2\cdot\lfloor\frac{C}{2}\rfloor} (1 + m_c^{(u_{CLIMAX})} \cdot s^{(u_{CLIMAX})}(t)) \cdot a_c^{(u_{CLIMAX})} \cdot e^{j\cdot\phi_c^{(u_{CLIMAX})}} \cdot e^{j\cdot 2\pi\cdot\left(\Delta f_c^{(u_{CLIMAX})}+\Delta f_{CLIMAX,c}^{(C)}\right)t} + n(t), \quad (2.6)$$

which after sampling with sampling rate $f_s = 1/T_s$, so $r(k) = r(t = k \cdot T_s)$, $k = 0, 1, \ldots, N_{data}-1$ reads:

$$r(k) = \sum_{u=1}^{U} (1 + m^{(u)} \cdot s^{(u)}(k)) \cdot a^{(u)} \cdot e^{j\cdot\phi^{(u)}} \cdot e^{j\cdot 2\pi\cdot\Delta f^{(u)}\cdot k\cdot T_s} + \sum_{c=1}^{2\cdot\lfloor\frac{C}{2}\rfloor} (1 + m_c^{(u_{CLIMAX})} \cdot s^{(u_{CLIMAX})}(k)) \cdot a_c^{(u_{CLIMAX})} \cdot e^{j\cdot\phi_c^{(u_{CLIMAX})}} \cdot e^{j\cdot 2\pi\cdot\left(\Delta f_c^{(u_{CLIMAX})}+\Delta f_{CLIMAX,c}^{(C)}\right)k\cdot T_s} + n(k), \quad k = 0, 1, \ldots, N_{data}-1, \quad (2.7)$$

The operator $\lfloor x \rfloor$ denotes the closest integer equal or below x.

Equation (2.7) is understood as follows:

C is the number of CLIMAX carriers. We define C=0 as 0-carrier CLIMAX-mode, which means that CLIMAX is not transmitted, and the sum in the second line of Equation (2.7) runs from the lower index c=1 to the upper index c=0 and is thus equal to zero, because the second index is lower than the first index. Thus, by allowing C=0 as a valid value, we would as a special case exclude CLIMAX in Equation (2.7).

As the CLIMAX offset for the carrier $\Delta f_{CLIMAX,c}^{(C)}$ for c=C, which is $\Delta f_{CLIMAX,c}^{(C)}$, is equal to zero following the convention in chapter 2.2, this CLIMAX carrier with index c=C is absorbed in the first line of Equation (2.7). and $\Delta f^{(u)}$ for $u=u_{CLIMAX}$ and c=C is $\Delta f^{(u)}$ for $u=u_{CLIMAX}$, and we write $$\Delta f_c^{(u)}|_{u=u_{CLIMAX},c=C} = \Delta f_c^{(u_{CLIMAX})} = \Delta f^{u_{CLIMAX}}. \quad (2.8)$$

The index u covers all the users' carriers, u=1, 2, ..., U.

It also covers a possible CLIMAX user $u=u_{CLIMAX}$.

Here, k is the integer time index. $a^{(u)}$ and $a_c^{(u)}$ are the (real-valued) overall channel gains of the individual user in the non-CLIMAX and the CLIMAX case, respectively, u=1, 2, ..., U, including the amplifiers, path loss over the channel, transmit and receive losses in the radio front-ends, and other amplifying components. $m^{(u)}$ and $m_c^{(u)}$ are the belonging modulation indices in the non-CLIMAX and CLIMAX case, respectively, and $\phi^{(u)}$ and $\phi_c^{(u)}$ are the belonging channel phases in the non-CLIMAX and CLIMAX case, respectively. By dealing with a simple channel gain instead of a filtering channel, we assume that the overall channel, including the physical channel, the amplifiers and all transmit and receive filters in RF, IF and baseband, to be non-frequency selective within the bandwidth of interest, so that the channel can be approximately described by a single filter tap. This assumption holds approximately, because the receive signal is narrowband. Trials showed that this assumption holds true with good approximation. If the non-frequency selectivity assumption would not hold, convolution with the overall channel impulse response would be required.

The (complex) channel gains $b^{(u)} = a^{(u)} \cdot e^{j\cdot\Phi^{(u)}}$ and $b_c^{(u)} = a_c^{(u)} \cdot e^{j\cdot\Phi_c^{(u)}}$ in the non-CLIMAX and CLIMAX cases, and the frequency offsets $\Delta f^{(u)}$ and $\Delta f_c^{(u)}$ in the non-CLIMAX and CLIMAX cases, respectively, due to Doppler effect and oscillator errors on the transmitter (Tx) and the receiver (Rx) side are unknown. Also, the noise signal n(k) and the users' voice signals $s^{(u)}(k)$ are unknown.

Equation (2.7) holds, no matter where the sampling was performed, on an intermediate frequency or in the complex baseband. $T_s$ is the sampling interval, so the inverse of the sampling frequency, on the receiver side. n(k) is assumed complex, white Gaussian noise with variance $\sigma_n^2$. This is a common assumption that holds approximately.

In order to increase the received signal quality, multiple Rx antennas might be employed, and their outputs each follow Equation (2.7), but with different $b^{(u)}$ and $b_c^{(u)}$, respectively, different $\Delta f^{(u)}$ and $\Delta f_c^{(u)}$, respectively, and different noise realizations n(k) on each Rx antenna branch. These signals can be combined. Because combining analogue signals is difficult, the antenna with the largest signal-to-noise ratio is often chosen, termed selection combining.

3 Detection of Double Transmissions Based on Interference Cancellation and Peak Detection in Colored Noise The receive signal r(k) is given in Equation (2.7).

One can observe from Table 2.1 and Table 2.2 and Equation (2.7) that:

If CLIMAX is used, all CLIMAX carriers $$a_c^{(u_{CLIMAX})} \cdot e^{j\cdot\phi_c^{(u_{CLIMAX})}} \cdot e^{j\cdot 2\pi\cdot\left(\Delta f_c^{(u_{CLIMAX})}+\Delta f_{CLIMAX,c}^{(C)}\right)k\cdot T_s}$$

are well separated in frequency. This also holds for the CLIMAX middle carrier $$a^{(u_{CLIMAX})} \cdot e^{j\cdot\phi^{(u_{CLIMAX})}} \cdot e^{j\cdot 2\pi\cdot\Delta f^{(u_{CLIMAX})}\cdot k\cdot T_s}.$$

And it also holds when considering frequency offset errors $\Delta f^{(u_{CLIMAX})}$ or $\Delta f_c^{(u_{CLIMAX})}$, respectively, because being ground stations, there is no Doppler effect in between ground transmitters and receivers and thus no contribution of the Doppler effect to $\Delta f^{(u_{CLIMAX})}$ or $\Delta f_c^{(u_{CLIMAX})}$, respectively. Thus, the frequency offset errors $\Delta f^{(u)}$ or $\Delta f_c^{(u)}$, respectively, are only due to hardware oscillator errors, which are small in ground transmitters and receivers due to their high quality oscillators.

Close to zero frequency, the carriers of mobile users $a^{(u)} \cdot e^{j \phi^{(u)}} \cdot e^{j \cdot 2 \pi \cdot \Delta f^{(u)} \cdot k \cdot T_s}$, $u \neq u_{CLIMAX}$ and, in case of non-CLIMAX, a ground station or, in case of CLIMAX case A, a CLIMAX transmission $$a^{(u_{CLIMAX})} \cdot e^{j \phi^{(u_{CLIMAX})}} \cdot e^{j \cdot 2 \pi \cdot \Delta f^{(u_{CLIMAX})} \cdot k \cdot T_s}$$

might be transmitted. All these carriers close to zero frequency in baseband are not well separated in frequency. When transmitted, they will normally overlap to some degree, at least with their DSB-AM voiced sidebands, and weaker carriers might even be shadowed by the DSB-AM voice sidebands.

As outlined above, if CLIMAX transmission cannot be obviated, it is not sufficient to simply detect two carriers and say that a double transmission occurred, because if both carriers stem from a ground station that transmits CLIMAX, only a single user would be transmitting, and no double transmission occurred. Thus, it is important which frequencies the detected carriers have.

In the frequency domain, the carriers $1 \cdot a^{(u)} \cdot e^{j \phi^{(u)}} \cdot e^{j \cdot 2 \pi \cdot \Delta f^{(u)} \cdot k \cdot T_s}$ (which might be a CLIMAX carrier using the above convention $$1 \cdot a_c^{(u)} \cdot e^{j \phi_c^{(u)}} \cdot e^{j \cdot 2 \pi \cdot (\Delta f_c^{(u)} + \Delta f_{CLIMAX,c}^{(C)}) \cdot k \cdot T_s} \bigg|_{c=C} =$$

$$1 \cdot a_C^{(u)} \cdot e^{j \phi_C^{(u)}} \cdot e^{j \cdot 2 \pi \cdot \Delta f_C^{(u)} \cdot k \cdot T_s} = 1 \cdot a^{(u)} \cdot e^{j \phi^{(u)}} \cdot e^{j \cdot 2 \pi \cdot \Delta f^{(u)} \cdot k \cdot T_s})$$

appear as distinct peaks in coloured noise, provided that the noise level at the peak frequency is low enough. The coloured noise is made up of the noise and the voiced sidebands.

The problem of how to best detect the carriers $1 \cdot a^{(u)} \cdot e^{j \phi^{(u)}} \cdot e^{j \cdot 2 \pi \cdot \Delta f^{(u)} \cdot k \cdot T_s}$ depends upon if they are to be detected close to zero frequency, where multiple signals of different users might overlap and are hard to detect, or close to distinct CLIMAX frequencies, where only single DSB-AM signals occur in coloured noise without overlap. This overlap of multiple DSB-AM signals close to zero frequency asks for interference cancellation: Once a stronger DSB-AM signal with a carrier close to zero frequency has been detected and cancelled, a second weaker user with a similar frequency offset can be detected more easily.

Close to zero frequency, the interference cancellation:
- can be carried out in the time domain, so on the data samples r(k), or, in another embodiment, in the frequency domain.
- can be designed to cancel only the carrier of the strongest user close to zero frequency, or cancel the whole DSB-AM signal component, including the voice sidebands, of the strongest user close to zero frequency. In order to cancel the whole DSB-AM signal component that is located close to zero frequency, a projection approach is proposed in the time domain and frequency domain.

Not close to zero frequency, the detection of distinct carriers is much easier, because interference could only occur from mobile users with extremely high Doppler frequencies and large oscillator errors. Therefore, these carriers appear without overlap as distinct peaks in coloured noise in the spectrum, where the noise is made up of noise and the DSB-AM's voice sidebands that the carrier belongs to.

In the following, first the interference cancellation approach is outlined, and then various options are outlined on how to detect the remaining peaks after interference cancellation as well as the detection of distinct peaks far apart from the zero frequency without interference cancellation.

Using Equation (2.7), it is in general required that the detector decides for one of the two hypotheses $$H_0 : r(k) = \sum_{u=1}^{U} (1 + m^{(u)} \cdot s^{(u)}(k)) \cdot a^{(u)} \cdot e^{j \phi^{(u)}} \cdot e^{j \cdot 2 \pi \cdot \Delta f^{(u)} \cdot k \cdot T_s} + \quad (3.1)$$

$$\sum_{c=1}^{2 \lceil \frac{C}{2} \rceil} (1 + m_c^{(u_{CLIMAX})} \cdot s^{(u_{CLIMAX})}(k)) \cdot a_c^{(u_{CLIMAX})} \cdot$$

$$e^{j \phi_c^{(u_{CLIMAX})}} \cdot e^{j \cdot 2 \pi \cdot (\Delta f_c^{(u_{CLIMAX})} + \Delta f_{CLIMAX,c}^{(C)}) \cdot k \cdot T_s} + n(k),$$

$$U \leq 1, k = 0, 1, \ldots, N_{data} - 1,$$

$$H_1 : r(k) = \sum_{u=1}^{U} (1 + m^{(u)} \cdot s^{(u)}(k)) \cdot a^{(u)} \cdot e^{j \phi^{(u)}} \cdot e^{j \cdot 2 \pi \cdot \Delta f^{(u)} \cdot k \cdot T_s} + \quad (3.2)$$

$$\sum_{c=1}^{2 \lceil \frac{C}{2} \rceil} (1 + m_c^{(u_{CLIMAX})} \cdot s^{(u_{CLIMAX})}(k)) \cdot a_c^{(u_{CLIMAX})} \cdot$$

$$e^{j \phi_c^{(u_{CLIMAX})}} \cdot e^{j \cdot 2 \pi \cdot (\Delta f_c^{(u_{CLIMAX})} + \Delta f_{CLIMAX,c}^{(C)}) \cdot k \cdot T_s} + n(k),$$

$$U \geq 2, k = 0, 1, \ldots, N_{data} - 1.$$

Note that the $H_0$ hypothesis covers two cases: First, noise only, second, a single user, represented by a single DSB-AM modulated carrier in the non-CLIMAX case or multiple carriers in the CLIMAX case, in noise. The $H_1$ hypothesis covers the case of two or more users, represented by two or more DSB-AM modulated carriers, in noise, compare Equation (2.7). In other words: As soon as a second user is detected, the $H_1$ hypothesis is fulfilled.

This hypothesis testing problem can be simplified in the non-CLIMAX case:

If CLIMAX is not used, the second line of Equation (3.1) and Equation (3.2) can be dropped, because C=0.

3.1 Interference Cancellation Using a Projection Approach to Detect Weaker Users With strong overlap predominantly occurring in RF close to the carrier frequency, the overlap occurs in baseband close to zero frequency. We show below that we are able to cancel the one DSB-AM signal that appears to be the strongest close to zero frequency. By this we mean that a DSB-AM signal far apart from the zero frequency, e.g. a CLIMAX signal with carrier offset, could have a higher peak at its carrier offset, but we choose to cancel the signal that has the strongest carrier within a limited bandwidth around zero frequency where the overlap occurs. This can be achieved by performing frequency offset estimation of the DSB-AM signal that occurs strongest close to zero frequency e.g. by computing a periodogram and find the maximum in a limited bandwidth around zero frequency. The bandwidth of the maximum search must not contain the peaks far apart from zero frequency, so if CLIMAX is used, not contain the CLIMAX carriers.

In order to cancel the dominant DSB-AM signal, its frequency is first estimated, and the whole signal r(k) is demodulated by that frequency. The dominant carrier close to zero frequency can either be:

- a noise sample in the pure noise case or in CLIMAX case B, where there is no carrier close to zero frequency, or a noise sample when the DSB-AM signal is weak. If after this demodulation, a significance of the noise sample is tested, the $H_0$ hypothesis will be judged for with high probability.
- a mobile user or non-CLIMAX ground station user, termed $u=u_{max}$, resulting in an unmodulated carrier $$a^{(u_{max})} \cdot e^{j \cdot \phi^{(u_{max})}} \cdot e^{j \cdot 2\pi \cdot \Delta f^{(u_{max})} \cdot k \cdot T_s}.$$

- a CLIMAX ground station with a CLIMAX carrier c=C close to zero frequency (case A), termed $u=u_{CLIMAX}=u_{max}$, resulting in an unmodulated carrier $$a_c^{(u_{CLIMAX})} \cdot e^{j \cdot \phi_c^{(u_{CLIMAX})}} \cdot e^{j \cdot 2\pi \cdot \left(\Delta f_c^{(u_{CLIMAX})} + \Delta f_{CLIMAX,c}^{(C)}\right) \cdot k \cdot T_s} \bigg|_{c=C, u_{CLIMAX}=u_{max}} = a_C^{(u_{max})} \cdot e^{j \cdot \phi_c^{(u_{max})}} \cdot e^{j \cdot 2\pi \cdot \Delta f_c^{(u_{max})} \cdot k \cdot T_s} = a^{(u_{max})} \cdot e^{j \cdot \phi^{(u_{max})}} \cdot e^{j \cdot 2\pi \cdot \Delta f^{(u_{max})} \cdot k \cdot T} \quad (3.3)$$

(Note that this term cannot be distinguished from mobile or non-CLIMAX carrier because of the writing convention Equation (2.8), used for the last equation).

Now, the carrier belonging to the strongest DSB-AM signal user $u=u_{max}$ is taken out of the sum in the first line and r(k) is rewritten as:

$$r(k) = (1 + m^{(u_{max})} \cdot s^{(u_{max})}(k)) \cdot a^{(u_{max})} \cdot e^{j \cdot \phi^{(u_{max})}} \cdot e^{j \cdot 2\pi \cdot \Delta f^{(u_{max})} \cdot k \cdot T_s} + \quad (3.4)$$

$$\sum_{\substack{u=1 \\ u \neq u_{max}}}^{U} (1 + m^{(u)} \cdot s^{(u)}(k)) \cdot a^{(u)} \cdot e^{j \cdot \phi^{(u)}} \cdot e^{j \cdot 2\pi \cdot \Delta f^{(u)} \cdot k \cdot T_s} +$$

$$\sum_{c=1}^{2 \cdot \left\lceil \frac{C}{2} \right\rceil} \left(1 + m_c^{(u_{CLIMAX})} \cdot s^{(u_{CLIMAX})}(k)\right) \cdot a_c^{(u_{CLIMAX})} \cdot$$

$$e^{j \cdot \phi_c^{(u_{CLIMAX})}} \cdot e^{j \cdot 2\pi \cdot \left(\Delta f_c^{(u_{CLIMAX})} + \Delta f_{CLIMAX,c}^{(C)}\right) \cdot k \cdot T_s} +$$

$$n(k), k = 0, 1, \ldots, N_{data} - 1.$$

The higher signal amplitude of the strongest user keeps (e.g. prevents) the receiving operator from hearing weaker users' voice signals. In accordance with an embodiment, the idea is to cancel the strongest user, and to be able to detect the presence of weaker users' signals in order to warn the receiving operator that a double transmission occurred.

If we assume detection of the strongest peak within a given detector bandwidth that is comprised of the band higher than the highest negative CLIMAX carrier and lower than the lowest positive CLIMAX carrier, we have a detector bandwidth symmetric around zero frequency. In the following, we assume with no loss of generality that user $u=u_{max}$ is observed to have the strongest channel gain $a^{(u_{max})} \geq a^{(u)}$, u=1, 2, ..., U, $u \neq u_{max}$, so that its frequency offset $\Delta f^{(u_{max})}$ and carrier phase $\phi^{(u_{max})}$ can be easily estimated and corrected in the received signal. This can either be achieved using an analog PLL (Phase Locked Loop) that uses r(t) as an input signal and locks to the strongest carrier frequency and phase and uses it for demodulation. The demodulated signal is then sampled, resulting in $r_{de\ mod}(k)$. A digital PLL is an alternative to the analogue PLL. Alternatively, $\Delta f^{(u_{max})}$ and $\phi^{(u_{max})}$ can be estimated from the sampled signal r(k), and a frequency and phase correction is carried out by multiplication with a complex phasor.

In any case, the demodulated signal is:

$$r_{demod}(k) = r(k) \cdot e^{-j \cdot \left(2\pi \cdot \Delta \hat{f}^{(u_{max})} \cdot k \cdot T_s + \hat{\phi}^{(u_{max})}\right)} \quad (3.5)$$

$$= (1 + m^{(u_{max})} \cdot s^{(u_{max})}(k)) \cdot$$

$$a^{(u_{max})} \cdot e^{j \cdot \left(\phi^{(u_{max})} - \hat{\phi}^{(u_{max})}\right)} \cdot$$

$$e^{j \cdot 2\pi \cdot \left(\Delta f^{(u_{max})} - \hat{f}^{(u_{max})}\right) k \cdot T_s} +$$

$$\sum_{\substack{u=1 \\ u \neq u_{max}}}^{U} (1 + m^{(u)} \cdot s^{(u)}(k)) \cdot$$

$$a^{(u)} \cdot e^{j \cdot \left(\phi^{(u)} - \hat{\phi}^{(u_{max})}\right)} \cdot$$

$$e^{j \cdot 2\pi \cdot \left(\Delta f^{(u)} - \Delta \hat{f}^{(u_{max})}\right) k \cdot T_s} +$$

$$\sum_{c=1}^{2 \cdot \left\lceil \frac{C}{2} \right\rceil} \left(1 + m_c^{(u_{CLIMAX})} \cdot s^{(u_{CLIMAX})}(k)\right) \cdot a_c^{(u_{CLIMAX})} \cdot$$

$$e^{j \cdot \left(\phi_c^{(u_{CLIMAX})} - \hat{\phi}^{(u_{max})}\right)} \cdot$$

$$e^{j \cdot 2\pi \cdot \left(\Delta f_c^{(u_{CLIMAX})} + \Delta f_{CLIMAX,c}^{(C)} - \Delta \hat{f}^{(u_{max})}\right) k \cdot T_s}$$

$$n(k) \cdot e^{-j \cdot \left(2\pi \cdot \Delta \hat{f}^{(u_{max})} \cdot k \cdot T_s + \hat{\phi}^{(u_{max})}\right)}, k = 0, 1, \ldots, N_{data} - 1.$$

The second line in Equation (3.5) shows the demodulated strongest user, the third line the remaining users, the fourth line the additional CLIMAX carriers and the fifth line the noise. All lines are frequency shifted by the estimated frequency offset and phase of the user $u_{max}$. Being complex white Gaussian noise, the frequency shifted and phase rotated noise $$n_{de\ mod}(k) = n(k) \cdot e^{-j \cdot \left(2\pi \cdot \Delta \hat{f}^{(u_{max})} \cdot k \cdot T_s + \hat{\phi}^{(u_{max})}\right)}, k = 0, 1, \ldots, N_{data} - 1 \quad (3.6)$$

remains complex white Gaussian. From the second line of Equation (3.5), it can be observed that the strongest user is real valued with good approximation, if $\phi^{(u_{max})} \approx \hat{\phi}^{(u_{max})}$ and $\Delta f^{(u_{max})} \approx \Delta \hat{f}^{(u_{max})}$, because $$e^{j \cdot \left(\phi^{(u_{max})} - \hat{\phi}^{(u_{max})}\right)} \approx 1$$

and $$e^{j\cdot 2\cdot \pi\cdot \left(\Delta f^{(u_{max})} - \Delta \hat{f}^{(u_{max})}\right)k\cdot T_s} \approx 1$$

and the remaining quantities are real valued by definition. Thus, taking the imaginary part of $r_{de\ mod}(k)$ results in a cancellation of the strongest user:

$$\text{Im}\{r_{demod}(k)\} = \text{Im}\left\{r(k)\cdot e^{-j\left(2\cdot\pi\cdot\Delta \hat{f}^{(u_{max})}\cdot k\cdot T_s + \hat{\phi}^{(u_{max})}\right)}\right\} \quad (3.7)$$

$$= \text{Im}\left\{(1+m^{(u_{max})}\cdot s^{(u_{max})}(k))\cdot a^{(u_{max})}\cdot\right.$$

$$e^{j\left(\phi^{(u_{max})}-\hat{\phi}^{(u_{max})}\right)}.$$

$$\left.e^{j\cdot 2\cdot\pi\cdot\left(\Delta f^{(u_{max})}-\Delta \hat{f}^{(u_{max})}\right)k\cdot T_s}\right\} +$$

$$\text{Im}\left\{\sum_{\substack{u=1\\u\neq u_{max}}}^{U}(1+m^{(u)}\cdot s^{(u)}(k))\cdot a^{(u)}\cdot\right.$$

$$\left.e^{j\left(\phi^{(u)}-\hat{\phi}^{(u_{max})}\right)}\cdot e^{j\cdot 2\cdot\pi\cdot\left(\Delta f^{(u)}-\Delta \hat{f}^{(u_{max})}\right)k\cdot T_s}\right\} +$$

$$\text{Im}\left\{\sum_{c=1}^{2\left\lceil\frac{C}{2}\right\rceil}(1+m_c^{(u_{CLIMAX})}\cdot s^{(u_{CLIMAX})}(k))\cdot\right.$$

$$a_c^{(u_{CLIMAX})}\cdot e^{j\left(\phi_c^{(u_{CLIMAX})}-\hat{\phi}^{(u_{max})}\right)}.$$

$$\left.e^{j\cdot 2\cdot\pi\cdot\left(\Delta f_c^{(u_{CLIMAX})}+\Delta f_{CLIMAX,c}^{(C)}-\Delta \hat{f}^{(u_{max})}\right)k\cdot T_s}\right\} +$$

$$\text{Im}\left\{n(k)\cdot e^{-j\left(2\cdot\pi\cdot\Delta \hat{f}^{(u_{max})}\cdot k\cdot T_s + \hat{\phi}^{(u_{max})}\right)}\right\},$$

$$k = 0, 1, \ldots, N_{data} - 1.$$

The second line in Equation (3.7) is approximately zero, the strongest user is cancelled.

$$\text{Im}\{r_{demod}(k)\} = \quad (3.8)$$

$$\text{Im}\left\{r(k)\cdot e^{-j\left(2\cdot\pi\cdot\Delta \hat{f}^{(u_{max})}\cdot k\cdot T_s + \hat{\phi}^{(u_{max})}\right)}\right\} \approx 0 + \sum_{\substack{u=1\\u\neq u_{max}}}^{U}(1+m^{(u)}\cdot s^{(u)}(k))\cdot$$

$$a^{(u)}\cdot\sin\left(2\cdot\pi\cdot\left(\Delta f^{(u)} - \Delta \hat{f}^{(u_{max})}\right)\cdot k\cdot T + \left(\phi^{(u)} - \hat{\phi}^{(u_{max})}\right)\right) +$$

$$\sum_{c=1}^{2\left\lceil\frac{C}{2}\right\rceil}(1+m_c^{(u_{CLIMAX})}\cdot s^{(u_{CLIMAX})}(k))\cdot a_c^{(u_{CLIMAX})}\cdot$$

$$\sin\left(2\cdot\pi\cdot\left(\Delta f_c^{(u_{CLIMAX})} + \Delta f_{CLIMAX,c}^{(C)} - \Delta \hat{f}^{(u_{max})}\right)\cdot k\cdot T +\right.$$

$$\left.\left(\phi_c^{(u_{CLIMAX})} - \hat{\phi}^{(u_{max})}\right)\right) +$$

$$\text{Re}\{n(k)\}\cdot\cos\left(2\cdot\pi\cdot\Delta \hat{f}^{(u_{max})}\cdot k\cdot T_s + \hat{\phi}^{(u_{max})}\right) +$$

$$\text{Im}\{n(k)\}\cdot\sin\left(2\cdot\pi\cdot\Delta \hat{f}^{(u_{max})}\cdot k\cdot T_s + \hat{\phi}^{(u_{max})}\right),$$

$$k = 0, 1, \ldots, N_{data} - 1.$$

Thus, a projection of the phase and frequency compensated signal onto the imaginary axis results in a cancellation of the strongest user's signal.

The projection onto the imaginary axis can be generalized in the following way: The direction of the projection is defined by a straight line from the origin of the complex IQ-plane through the complex number p. The straight line perpendicular to the projection axis through p is a straight line through the complex number $p^\perp = p\cdot\exp(-j\pi/2) = -j\cdot p = \text{Im}\{p\} - j\cdot\text{Re}\{p\}$, so that a projection operator that performs a projection on the axis spanned by p can be written $$\text{Proj}_p\{\cdot\} = \frac{\text{Re}\{\{\cdot\}\cdot p^*\}}{|p|^2} = \frac{\text{Re}\{\{\cdot\}\cdot(\text{Re}\{p\} - j\cdot\text{Im}\{p\})\}}{|p|^2}. \quad (3.9)$$

For the special case of a projection of $p^\perp$ on p, Equation (3.9) yields $$\text{Proj}_p\{p^\perp\} = \frac{\text{Re}\{p^\perp\cdot p^*\}}{|p|^2} = \frac{\text{Re}\{(\text{Im}\{p\} - j\cdot\text{Re}\{p\})\cdot(\text{Re}\{p\} - j\cdot\text{Im}\{p\})\}}{|p|^2} \quad (3.10)$$

$$= \frac{\text{Re}\{-j\cdot(\text{Re}^2\{p\} + \text{Im}^2\{p\})\}}{|p|^2} = \text{Re}\left\{\frac{-j\cdot(\text{Re}^2\{p\} + \text{Im}^2\{p\})}{|p|^2}\right\}.$$

$$= \text{Re}\{-j\}$$

$$= 0$$

Also, projection of $r\cdot p^\perp$, with r real valued, on p, yields zero:

$$\text{Proj}_p\{r\cdot p^\perp\} = \frac{\text{Re}\{r\cdot p^\perp\cdot p^*\}}{|p|^2} = \frac{\text{Re}\{r\cdot(\text{Im}\{p\} - j\cdot\text{Re}\{p\})\cdot(\text{Re}\{p\} - j\cdot\text{Im}\{p\})\}}{|p|^2} = 0. \quad (3.11)$$

The signal $$r_{f-comp}(k) = r(k)\cdot e^{-j\left(2\cdot\pi\cdot\Delta \hat{f}^{(u_{max})}\cdot k\cdot T_s\right)}$$

is a complex phasor in the complex IQ-plane. Displacement of the phase compensated signal $$r_{de\ mod}(k) = r(k)\cdot e^{-j\left(2\cdot\pi\cdot\Delta \hat{f}^{(u_{max})}\cdot k\cdot T_s + \hat{\phi}^{(u_{max})}\right)}$$

by multiplication with $p^\perp$ results in a displaced signal perpendicular to the projection axis from the origin of the complex IQ-plane through the complex number p. Thus, projection $\text{Proj}_p\{\cdot\}$ of $p^\perp\cdot r_{de\ mod}(k)$ onto the projection axis through p cancels the strongest user:

$$\text{Proj}_p\{p^\perp\cdot r_{demod}(k)\} = \text{Proj}_p\left\{p^\perp\cdot r(k)\cdot e^{-j\left(2\cdot\pi\cdot\Delta \hat{f}^{(u_{max})}\cdot k\cdot T_s + \hat{\phi}^{(u_{max})}\right)}\right\} \quad (3.12)$$

$$= \text{Proj}_p\{p^\perp\cdot(1+m^{(u_{max})}\cdot s^{(u_{max})}(k))\cdot a^{(u_{max})}\cdot$$

$$e^{j\left(\phi^{(u_{max})} - \hat{\phi}^{(u_{max})}\right)}\cdot e^{j\cdot 2\cdot\pi\cdot\left(\Delta f^{(u_{max})} - \hat{\Delta}^{(u_{max})}\right)k\cdot T_s}\} +$$

-continued $$Proj_p \left\{ p^{\perp} \cdot \sum_{\substack{u=1 \\ u \neq u_{max}}}^{U} (1 + m^{(u)} \cdot s^{(u)}(k)) \cdot a^{(u)} \cdot \right.$$

$$\left. e^{j \cdot \left( \phi^{(u)} - \hat{\phi}^{(u_{max})} \right)} \cdot e^{j \cdot 2 \cdot \pi \cdot \left( \Delta f^{(u)} - \Delta \hat{f}^{(u_{max})} \right) \cdot k \cdot T_s} \right\} +$$

$$Proj_p \left\{ p^{\perp} \cdot \sum_{c=1}^{2 \cdot \left\lceil \frac{C}{2} \right\rceil} \left( 1 + m_c^{(u_{CLIMAX})} \cdot s^{(u_{CLIMAX})}(k) \right) \cdot \right.$$

$$a_c^{(u_{CLIMAX})} \cdot e^{j \cdot \left( \phi_c^{(u_{CLIMAX})} - \hat{\phi}^{(u_{max})} \right)} \cdot$$

$$\left. e^{j \cdot 2 \cdot \pi \cdot \left( \Delta f_c^{(u_{CLIMAX})} + \Delta f_{CLIMAX,c}^{(C)} - \Delta \hat{f}^{(u_{max})} \right) \cdot k \cdot T_s} \right\} +$$

$$Proj_p \left\{ p^{\perp} \cdot n(k) \cdot e^{-j \left( 2 \cdot \pi \cdot \Delta \hat{f}^{(u_{max})} \cdot k \cdot T_s + \hat{\phi}^{(u_{max})} \right)} \right\}$$

$$= Re \left\{ \frac{\begin{array}{c} p^{\perp} \cdot p^* \cdot (1 + m^{(u_{max})} \cdot s^{(u_{max})}(k)) \cdot a^{(u_{max})} \cdot \\ e^{j \cdot \left( \phi^{(u_{max})} - \hat{\phi}^{(u_{max})} \right)} e^{j \cdot 2 \cdot \pi \cdot \left( \Delta f^{(u_{max})} - \Delta \hat{f}^{(u_{max})} \right) \cdot k \cdot T_s} \end{array}}{|p|^2} \right\} +$$

$$Re \left\{ \frac{\begin{array}{c} p^{\perp} \cdot p^* \cdot \sum_{\substack{u=1 \\ u \neq u_{max}}}^{U} (1 + m^{(u)} \cdot s^{(u)}(k)) \cdot a^{(u)} \cdot \\ e^{j \cdot \left( \phi^{(u)} - \hat{\phi}^{(u_{max})} \right)} e^{j \cdot 2 \cdot \pi \cdot \left( \Delta f^{(u)} - \Delta \hat{f}^{(u_{max})} \right) \cdot k \cdot T_s} \end{array}}{|p|^2} \right\} +$$

$$Re \left\{ \frac{\begin{array}{c} p^{\perp} \cdot p^* \cdot \sum_{c=1}^{2 \cdot \left\lceil \frac{C}{2} \right\rceil} \left( 1 + m_c^{(u_{CLIMAX})} \cdot s^{(u_{CLIMAX})}(k) \right) \cdot \\ a_c^{(u_{CLIMAX})} \cdot e^{j \cdot \left( \phi_c^{(u_{CLIMAX})} - \hat{\phi}^{(u_{max})} \right)} \\ e^{j \cdot 2 \cdot \pi \cdot \left( \Delta f_c^{(u_{CLIMAX})} + \Delta f_{CLIMAX,c}^{(C)} - \Delta \hat{f}^{(u_{max})} \right) \cdot k \cdot T_s} \end{array}}{|p|^2} \right\} +$$

$$Re \left\{ \frac{p^{\perp} \cdot p^* \cdot n(k) \cdot e^{-j \left( 2 \cdot \pi \cdot \Delta \hat{f}^{(u_{max})} \cdot k \cdot T_s + \hat{\phi}^{(u_{max})} \right)}}{|p|^2} \right\}$$

$$= Re \left\{ -j \cdot (1 + m^{(u_{max})} \cdot s^{(u_{max})}(k)) \cdot a^{(u_{max})} \cdot \right.$$

$$\left. e^{j \cdot \left( \phi^{(u_{max})} - \hat{\phi}^{(u_{max})} \right)} e^{j \cdot 2 \cdot \pi \cdot \left( \Delta f^{(u_{max})} - \Delta \hat{f}^{(u_{max})} \right) \cdot k \cdot T_s} \right\} +$$

$$Re \left\{ -j \cdot \sum_{\substack{u=1 \\ u \neq u_{max}}}^{U} (1 + m^{(u)} \cdot s^{(u)}(k)) \cdot a^{(u)} \cdot \right.$$

$$\left. e^{j \cdot \left( \phi^{(u)} - \hat{\phi}^{(u_{max})} \right)} e^{j \cdot 2 \cdot \pi \cdot \left( \Delta f^{(u)} - \Delta \hat{f}^{(u_{max})} \right) \cdot k \cdot T_s} \right\} +$$

$$Re \left\{ -j \cdot \sum_{c=1}^{2 \cdot \left\lceil \frac{C}{2} \right\rceil} \left( 1 + m_c^{(u_{CLIMAX})} \cdot s^{(u_{CLIMAX})}(k) \right) \cdot \right.$$

$$a_c^{(u_{CLIMAX})} \cdot e^{j \cdot \left( \phi_c^{(u_{CLIMAX})} - \hat{\phi}^{(u_{max})} \right)}$$

$$\left. e^{j \cdot 2 \cdot \pi \cdot \left( \Delta f_c^{(u_{CLIMAX})} + \Delta f_{CLIMAX,c}^{(C)} - \Delta \hat{f}^{(u_{max})} \right) \cdot k \cdot T_s} \right\} +$$

$$Re \left\{ -j \cdot n(k) \cdot e^{-j \left( 2 \cdot \pi \cdot \Delta \hat{f}^{(u_{max})} \cdot k \cdot T_s + \hat{\phi}^{(u_{max})} \right)} \right\},$$

$$k = 0, 1, \ldots, N_{data} - 1.$$

Using $$Re\{-j \cdot z\} = Re\{-j \cdot [Re\{z\} + j \cdot Im\{z\}]\} = Re\{Im\{z\} - j \cdot Re\{z\}\} = Im\{z\} \quad (3.13)$$

for Equation (3.12) we have the result of Equation (3.7)

$$Proj_p\{p^\perp \cdot r_{demod}(k)\} = Im\left\{r(k) \cdot e^{-j\left(2\pi \cdot \Delta \hat{f}^{(u_{max})} \cdot k \cdot T_s + \hat{\phi}^{(u_{max})}\right)}\right\} \quad (3.14)$$

$$= Im\left\{(1 + m^{(1)} \cdot s^{(1)}(k)) \cdot a^{(1)} \cdot e^{j\left(\phi^{(u_{max})} - \hat{\phi}^{(u_{max})}\right)} \cdot e^{j \cdot 2\pi \cdot \left(\Delta f^{(u_{max})} - \Delta \hat{f}^{(u_{max})}\right) \cdot k \cdot T_s}\right\} +$$

$$Im\left\{\sum_{\substack{u=1 \\ u \neq u_{max}}}^{U} (1 + m^{(u)} \cdot s^{(u)}(k)) \cdot a^{(u)} \cdot e^{j\left(\phi^{(u)} - \hat{\phi}^{(u_{max})}\right)} \cdot e^{j \cdot 2\pi \cdot \left(\Delta f^{(u)} - \Delta \hat{f}^{(u_{max})}\right) \cdot k \cdot T_s}\right\} +$$

$$Im\left\{\sum_{c=1}^{2 \cdot \lceil \frac{C}{2} \rceil} (1 + m_c^{(u_{CLIMAX})} \cdot s^{(u_{CLIMAX})}(k)) \cdot a_c^{(u_{CLIMAX})} \cdot e^{j\left(\phi_c^{(u_{CLIMAX})} - \hat{\phi}^{(u_{max})}\right)} \cdot e^{j \cdot 2\pi \left(\Delta f_c^{(u_{CLIMAX})} + \Delta f_{CLIMAX,c}^{(C)} - \Delta \hat{f}^{(u_{max})}\right) \cdot k \cdot T_s}\right\} +$$

$$Im\left\{n(k) \cdot e^{-j\left(2\pi \cdot \Delta \hat{f}^{(u_{max})} \cdot k \cdot T_s + \hat{\phi}^{(u_{max})}\right)}\right\} =$$

$$Im\{r_{demod}(k)\}, k = 0, 1, \ldots, N_{data} - 1.$$

which results again in Equation (3.8), so that the projection of $r_{de\ mod}(k)$ on the imaginary axis $Im\{r_{de\ mod}(k)\}$ is only a special, but easy to implement, case of the general projection of $p^\perp \cdot r_{de\ mod}(k)$ on p, which is $Proj_p\{p^\perp \cdot r_{de\ mod}(k)\}$.

$$Proj_p\{p^\perp \cdot r_{demod}(k)\} \approx 0 + \sum_{\substack{u=1 \\ u \neq u_{max}}}^{U} (1 + m^{(u)} \cdot s^{(u)}(k)) \cdot a^{(u)} \cdot \quad (3.15)$$

$$\sin\left(2 \cdot \pi \cdot \left(\Delta f^{(u)} - \Delta \hat{f}^{(u_{max})}\right) \cdot k \cdot T + \left(\phi^{(u)} - \hat{\phi}^{(u_{max})}\right)\right) +$$

$$\sum_{c=1}^{2 \cdot \lceil \frac{C}{2} \rceil} (1 + m_c^{(u_{CLIMAX})} \cdot s^{(u_{CLIMAX})}(k)) \cdot a_c^{(u_{CLIMAX})} \cdot$$

$$\sin\left(2 \cdot \pi \cdot \left(\Delta f_c^{(u_{CLIMAX})} + \Delta f_{CLIMAX,c}^{(C)} - \Delta \hat{f}^{(u_{max})}\right) \cdot k \cdot T + \left(\phi_c^{(u_{CLIMAX})} - \hat{\phi}^{(u_{max})}\right)\right) +$$

$$Re\{n(k)\} \cdot \cos\left(2 \cdot \pi \cdot \Delta \hat{f}^{(u_{max})} \cdot k \cdot T_s + \hat{\phi}^{(u_{max})}\right) +$$

$$Im\{n(k)\} \cdot \sin\left(2 \cdot \pi \cdot \Delta \hat{f}^{(u_{max})} \cdot k \cdot T_s + \hat{\phi}^{(u_{max})}\right),$$

$$k = 0, 1, \ldots, N_{data} - 1.$$

Note that a projection axis from the origin through $$p'^\perp = p \cdot \exp(j\pi/2) = j \cdot p = -Im\{p\} + j \cdot Re\{p\} = -[Im\{p\} - j \cdot Re\{p\}] = -p^\perp \quad (3.16)$$

results in the same projection axis as the projection axis from the origin through $p^\perp$, because if p is an orthogonal vector to $p^\perp$, then it is also an orthogonal to $p'^\perp = -p^\perp$.

The remaining signal $Proj_p\{p^\perp \cdot r_{de\ mod}(k)\}$ is made up of the remaining users signal components in the second line of Equation (3.15), modulated with a sine carrier that contains their frequency offsets and phase offsets, corrected by the frequency offset and phase offset of the strongest user. In the third and fourth line, the modulated noise components can be observed.

Equation (3.15) can now be used to detect if at least a single weaker user's signal is present and thus to check if the $H_1$ hypothesis is fulfilled, so that a double transmission occurred. This is outlined in the following chapter.

3.2 Transforming the Projection Approach to the Frequency Domain

Instead of performing the projection approach in the time domain $$Proj_p\{p^\perp \cdot r_{demod}(k)\} = \quad (3.17)$$

$$Im\left\{r(k) \cdot e^{-j\left(2\pi \cdot \Delta \hat{f}^{(u_{max})} \cdot k \cdot T_s + \hat{\phi}^{(u_{max})}\right)}\right\} = Im\{r_{demod}(k)\},$$

on the signal $r_{de\ mod}(k)$, according to another embodiment one can transform this signal also to the frequency domain and perform the cancellation there. This can be achieved using the fact that the strongest user's signal contained in $r_{de\ mod}(k)$ is real valued, see of Equation (3.5) and the notes below, and thus the Discrete Time Fourier Transform (DTFT) of the strongest user's signal contained in $r_{de\ mod}(k)$, which we denote $R_{strongest,de\ mod}(e^{j2\pi f \cdot T_s}) = DTFT\{r_{strongest,de\ mod}(k)\}$, is conjugate symmetric about frequency zero:

$$R_{strongest,de\ mod}(e^{j2\pi f \cdot T_s}) = R_{strongest,de\ mod}^*(e^{-j2\pi f \cdot T_s}). \quad (3.18)$$

Because of the identity of complex numbers z $$Im\{z\} = \frac{1}{2j} \cdot (z - z^*), \quad (3.19)$$

with z* denoting the conjugate complex of z, $R_{Im,de\ mod}(e^{j2\pi f \cdot T_s})$ can be written $$R_{Im,demod}(e^{j2\pi f \cdot T_s}) = DTFT\{Im\{r_{demod}(k)\}\} = \frac{1}{2j} \cdot \quad (3.20)$$

$$DTFT\{r_{demod}(k) - r_{demod}^*(k)\}$$

$$= \frac{1}{2j} \cdot (R_{demod}(e^{j2\pi f \cdot T_s}) - R_{demod}^*(e^{-j2\pi f \cdot T_s})).$$

By the subtraction in the last line of Equation (3.25), all conjugate symmetric components contained in the $R_{de\ mod}(e^{j2\pi f \cdot T_s}) = DTFT\{r_{de\ mod}(k)\}$ are subtracted, so that the strongest user's signal component $R_{strongest,de\ mod}(e^{j2\pi f \cdot T_s})$ is cancelled from the signal because of its conjugate symmetry stated in Equation (3.23). Thus, the strongest user can also be cancelled in the spectral domain, e.g. by subtracting the from the Discrete Fourier Transform (DFT) of $r_{de\ mod}(k)$ the conjugate complex, spectrally flipped DFT of the same signal:

$$DFT\{\text{Im}\{r_{demod}(k)\}\} = \frac{1}{2j} \cdot DFT\{r_{demod}(k) - r^*_{demod}(k)\} \quad (3.21)$$

$$= \frac{1}{2j} \cdot (R_{demod}(n) - R^*_{demod}(N-1-n)).$$

Here, $R_{de\ mod}(n)$ has the discrete frequency index n of the DFT. With zero-padding, the spectral peaks of weaker user's signal components contained in $R_{de\ mod}(n)$ are enhanced an can be easily detected by a statistical test observing the weaker user's carrier peak above the noise threshold.

3.3 Spectral Line Detection in Colored Noise

In dealing with a feature that is observable in the frequency domain, we have to estimate the spectrum and discriminate the feature there.

According to P. Stoica, R. Moses, "Spectral Analysis of Signals," Prentice Hall, Upper Saddle River, New Jersey, 2005 (referred to as [STO05] in the following), the spectral estimation problem can be formulated as follows: From a finite record of a stationary[1] data sequence, estimate how the total power is distributed over frequency. Two broad approaches exist: non-parametric methods and parametric methods. Non-parametric methods can be interpreted as sweeping a narrowband filter through the bandwidth of interest, and the filter output power divided by the filter bandwidth is treated as a measure of the spectral content of the signal being processed. The non-parametric methods are based on the approximation of the periodogram by the Discrete Fourier Transform (DFT) in practice, see In particular, FIG. 2 b) to e). Parametric methods, however, postulate a signal model for the data and hence for the belonging spectrum, and reduce the spectral estimation problem to a parameter estimation problem. They can achieve high frequency resolution. Non-parametric approaches, however, have a limited frequency resolution because of the DFT employed.

[1] For non-stationary data sequences, like voice signals, short-time stationary over time intervals $\Delta t_{stationary}$ is assumed, and the same approach can be followed as taken here. Often, segmentation of the data in possibly overlapping, short-time stationary subblocks is then used, as in the Short Time Fourier Transform (STFT).

Frequency resolution is the ability to resolve details of the signal in the spectrum. The frequency resolution of the DFT is approximately $f_s/N_{data}$ [STO05], thus, is inversely proportional to the data record length $N_{data}$. Thus, with non-parametric methods, two DSB-AM carriers can be resolved only with said frequency resolution of approximately $f_s/N_{data}$. Using parametric approaches such as Burg's method, the resolution is finer than for non-parametric methods. If distinct features in the voice signal were of interest, the resolution would be limited by the non-stationary character of the voice signal included, because the maximum time-window $\Delta t_{stationary}$ limits $N_{data}$ for a given sampling rate $f_s$ to $\Delta_{stationary} = N_{data}/f_s$. However, we are interested in the spectral peaks here, stemming from the unmodulated carriers contained in the DSB-AM signal. The instationary voiced signal part is only interesting regarding its symmetry, which is clearly observable also with a simple DFT for interval lengths for which the voice signals are clearly instationary. Although $C_{STFT}(n)$ in particular, FIG. 2 e) provides a spectral estimate with less variance for given data record $\{r(k)\}_{k=0}^{N_{data}-1}$ of length $N_{data}$ due to averaging over multiple DFTs on partial records shorter than $N_{data}$, its resolution is worse than that of a single DFT with length $N_{data}$. Thus, by using only the carriers, which are deterministic signal components, for detection, the frequency resolution is only limited by the allowed delay of the detector and the increase in complexity using larger data records, but not by the instationarity. By using a DFT window $N_{data}$ that is longer than the number of samples that a voice signal can be considered short-time stationary $\Delta t_{stationary}$, the spectra of the non-stationary voice signal are averaged over the duration of the window, and non-stationary signal events from the voice component are not resolved as separate or distinct signal events. These events are just averaged out the larger $N_{data}$ is. This is desired, because voice features are not used here, and therefore, averaging them out similar to a noise signal, helps to suppress the instationary voice signal, not diminishing the stationary carriers, so that the carriers appear as more distinctive peaks in the spectrum.

Here, we detail the non-parametric approach, because the signal is comprised not only of tones, but also of voice signals. The parametric methods would have to include a modeling of the voiced sidebands. This can be done by assuming an Auto-Regressive (AR) model for the voice (e.g. Burg's method). This is not easy to parameterize. Model mismatch might lead to wrong detection results. The non-parametric methods, however, treat the voice spectrum below the spectral peaks as colored noise and are very robust to model mismatch.

The detector works directly on the estimated spectrum of the received samples r(k). By 'directly' we mean that a transform of the received samples r(k) to the spectral domain is performed e.g. by means of a Fourier transform, and that there are no nonlinearities employed in the time domain that do generate additional spectral features to detect in the frequency domain, as done e.g. by phase demodulation [Lipp10] or other nonlinearities that generate additional spectral lines. Here, estimating the spectrum of r(k), no additional spectral lines are generated at other frequencies than those occupied by the input signal r(k). In particular, FIG. 2 a) shows the required pre-processing, In particular, FIG. 2 b)-e) show some practical implementations using the Discrete Fourier Transform (DFT).

Figure 2:
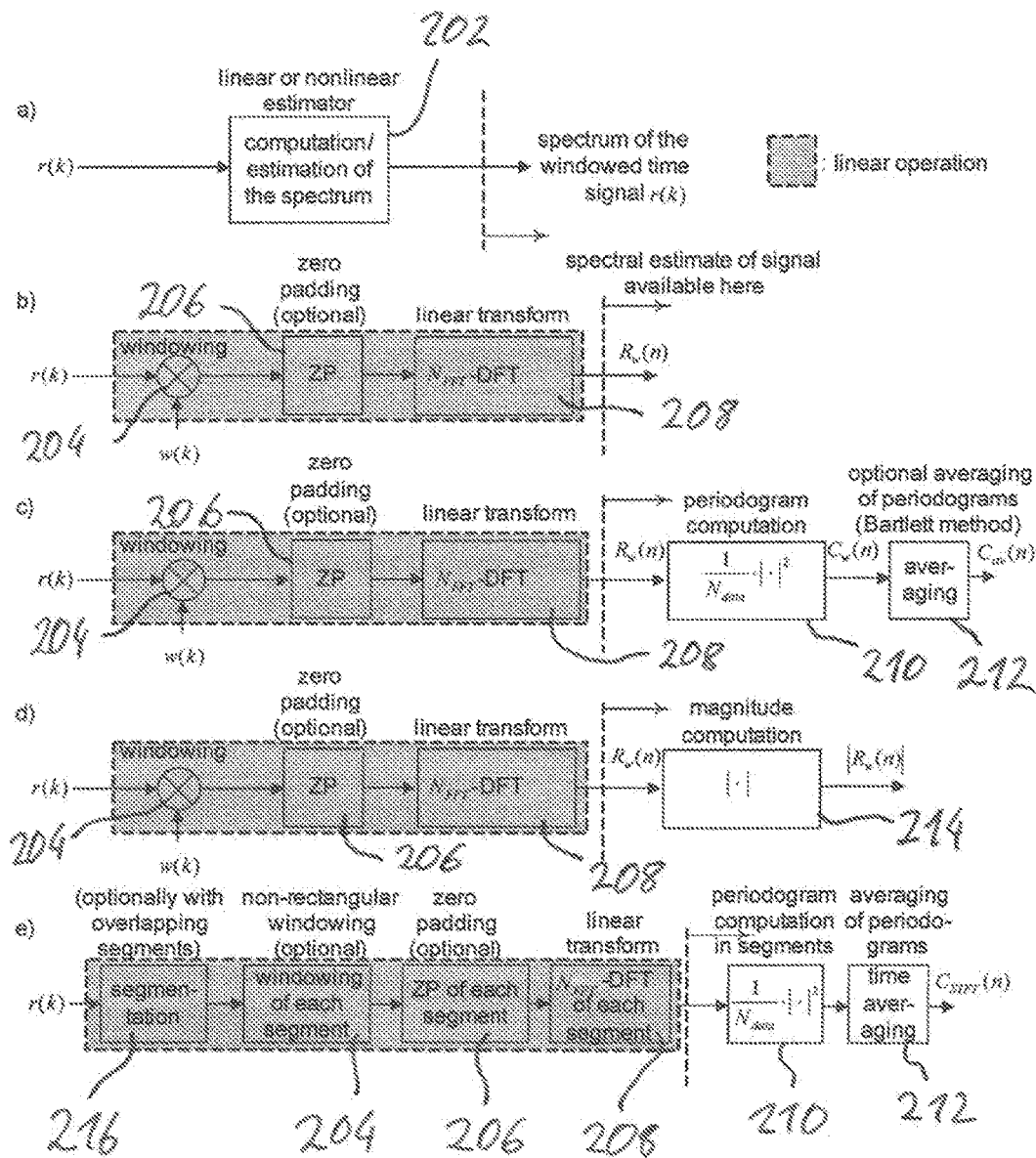
FIG. 2 shows pre-processing of the receive signal r(k) for the frequency domain solutions.

In particular, FIG. 2 shows Pre-processing of the receive signal r(k) without generation of additional spectral features prior to spectral estimation and detection. In particular, FIG. 2 a) shows in a general form, optional windowing followed by either a linear spectral transform, consisting of operations such as segmentation as in e.g. the Welch method, windowing, zero padding, and time averaging of partial spectral estimates, e.g. performed by a linear estimator or by a nonlinear estimator (generally indicated at 202), resulting in a spectrum of the windowed time signal r(k). FIG. 2 b) shows an exemplary implementation employing windowing (e.g. by a windowing unit 204), optional zero-padding (e.g. by a zero-padding unit 206) and FFT (e.g. by a Fourier transform unit 208). FIG. 2 c) shows an exemplary implementation, similar to the one shown in FIG. 2 b), but with a periodogram computation in a periodiogram computation unit 210, and optional averaging of periodograms (Bartlett method), e.g. by an averaging unit 212. FIG. 2 d) shows a further exemplary implementation according to embodiments of the herein disclosed subject matter. The implementation in FIG. 2 d) is similar to the one in FIG. 2 b), but with magnitude computation, e.g. by a magnitude computation unit 214. FIG. 2 e) shows a further exemplary implementation in accordance with embodiments of the herein disclosed subject matter, comprising computation of the Short Time Fourier Transform (STFT), see e.g. Bin Yang, "A Study Of The Inverse Short Fourier Transform," Proc. Acoustics, Speech and Signal Processing, 2008. ICASSP 2008. IEEE International Conference on, pp. 3541-3544, Mar. 31, 2008-Apr. 4, 2008 ([YANG08]), wherein the Welch method [STO05] is a special case. For example, in accordance with embodiments of the herein disclosed subject matter, an exemplary implementation comprises segmentation of the receive signal r(k) (e.g. by a segmentation unit 216), windowing of each segment (e.g. by a windowing unit 204), optional zero-padding of each segment (e.g. by a zero-padding unit 206), Fourier transformation of each segment (e.g. by a Fourier transform unit 208), periodogram computation in the segments, e.g. by a periodogram computation unit 210 and subsequent time averaging of the periodogram, e.g. by an averaging unit 212.

It is true that the magnitude computation or the squared magnitude computation are also nonlinear. However, working in the frequency domain instead of the time domain, these nonlinear operations neither generate additional spectral lines for detection, nor do they drop the modulus of the received samples r(k), as in Friedrich Lipp, "Method and device for detecting simultaneous double transmission of AM signals", US patent No. 2010/0067570 A1, published Mar. 18, 2010 ([Lipp10]). They just serve for an extraction of the magnitude out of the complex-valued spectrum $R_w(e^{j2\pi \cdot f \cdot T_s k})$, so the magnitude spectrum $|R_w(e^{j2\pi \cdot f \cdot T_s k})|$ or the power spectral density estimate provided by the periodogram $C_w(e^{j2\pi \cdot f \cdot T_s k}) \sim |R_w(e^{j2\pi \cdot f \cdot T_s k})|^2$, instead of modifying r(k) by a nonlinearity (phase demodulator [LIPP10], or nonlinear filtering, or polynomial) in the time domain and estimating thus the spectrum or a modified signal instead of r(k).

Other approaches to get refined spectral estimates of r(k) related to the magnitude spectrum exists. E.g., the squared magnitude spectrum of r(k) can be computed from the Fourier transform of the biased auto-correlation estimate $r_{r_w r_w}(\kappa)$, shown here with the DTFT:

$$C_w(e^{j2\pi \cdot f \cdot T_s k}) = \qquad (3.22)$$
$$\frac{1}{N_{data}} \cdot |R_w(e^{j2\pi \cdot f \cdot T_s k})|^2 = \frac{1}{N_{data}} \cdot R_w(e^{j2\pi \cdot f \cdot T_s k}) \cdot R_w^*(e^{j2\pi \cdot f \cdot T_s k}) =$$
$$\sum_{k=-\infty}^{\infty} \sum_{k'=-\infty}^{\infty} r_w(k) r_w^*(k') e^{-j2\pi \cdot f \cdot f_s \cdot T_s(k-k')} =$$
$$\sum_{\kappa=0}^{N_{date}-1} r_{r_w r_w}(\kappa) e^{-j2\pi \cdot f \cdot T_s \kappa},$$

where $$r_{rr}(\kappa) = \sum_{k=-\infty}^{\infty} r_w(k) r_w^*(k - \kappa). \qquad (3.23)$$

Thus, if the squared magnitude spectrum of r(k) is chosen for spectral detection, the DFT of the auto-correlation can also be used to compute it, termed correlogram, as an alternative to computing the DFT and scaling its absolute squared value, termed periodogram, as in particular, FIG. 2 c).

In practice, the bias of the auto-correlation estimate over N samples $$\hat{r}_{r_w r_w}(\kappa) = \frac{1}{N - |\kappa|} \sum_{k=0}^{N-|\kappa|-1} r_w^*(k) r_w(k + \kappa), \qquad (3.24)$$
$$\kappa = 0, \ldots, N - 1$$

can additionally be reduced by tapering and windowing (e.g. the Blackman-Tukey approach). In addition, the variance of the estimate $\hat{r}_{rr}(\kappa)$ can be decreased by averaging or smoothing. If e.g. the auto-correlation is computed first, overlapped segments can be used for an improved autocorrelation estimate, prior to computing the DFT for estimating the periodogram. Until now, we have listed some approaches to provide good estimates of the spectrum, magnitude spectrum or power spectral density of r(k).

All the spectral estimators have one thing in common: The computed spectral estimates show distinct peaks at the carrier frequency of each user present transmitting a DSB-AM signal. Because no additional spectral lines are generated by nonlinearities, each peak corresponding to a user can be detected and cancelled from the spectrum. Each peak of a DSB-AM carrier is surrounded by voiced sidebands. The feature that is used for detection consists of the peaks from the computed spectrum of r(k), but does not consist of features generated due to nonlinear operations in the time domain, that have a different spectrum (e.g. periodogram). This is in contrast to e.g. [LIPP10], where a nonlinearity is used in the time domain in order to generate a feature that allows for the discrimination between the two hypothesis stated in Equation (3.1) and Equation (3.2). In [LIPP10], the nonlinear operation approach is to use a phase demodulator, and the detector works on the spectrum of the phase demodulated receive signal. Other nonlinear pre-processing approaches might exist. Estimating the spectrum of r(k), however, no new spectral lines are generated in the approach presented here, as produced e.g. by intermodulations due to nonlinearities in the time domain. This also holds for the above mentioned methods that first estimate the autocorrelation of the received samples, e.g. the Blackman-Tukey method, because due to Eq. (3.22) this is just the periodogram estimate. We will see below that in contrast to the nonlinearly in the time domain pre-processed detectors to generate spectral features for detection, e.g. by generation of spectral lines at additional frequencies, the detector that is based on spectral estimates of r(k) allows for the detector to be easily adapted to CLIMAX transmission, because the order of linear operations like filtering and DFT can be interchanged if no new spectral lines are generated, leading to a low complexity implementation. This is in contrast to [Lipp10], where the nonlinear phase demodulation is carried out in the time domain prior to a DFT, so that a filter for CLIMAX components cannot be interchanged with the nonlinearity. In addition, non-linear operations that generate additional spectral lines, as used e.g. in [Lipp10], increase the noise floor. The techniques used here, however, are optimum pre-processing techniques in terms of Maximum Likelihood Detection (MLD).

Spectral estimators have to work on finite sample records. If a continuous estimation is desired, the estimates stemming from successive time windows can be averaged and also overlapped. The multiplication with w(k) in particular, FIG. 2 cuts out a finite segment of samples r(k) to be processed. An alternative is the segmentation approach averaging over multiple time windows that is even capable to work interleaved for techniques working with overlapping windows of received samples. All techniques, with or without averaging, with or without overlapping, are linear operations on r(k) Bin Yang, "A Study Of The Inverse Short Fourier Transform," *Proc. Acoustics, Speech and Signal Processing*, 2008. ICASSP 2008. IEEE International Conference on, pp. 3541-3544, Mar. 31, 2008-Apr. 4, 2008, [Yang08]). w(k) has to have finite support for this, so only a finite number of samples in w(k) are non-zero. If the non-zero samples have the same height, no weighting in the time domain occurs. If the non-zero samples in w(k) are unequal, like in a Hann window or a Hamming window, the spectrum is additionally shaped by w(k).

3.4 Procedure for Multiple Peak Detection for DSB-AM Signals with Widely Separated Carrier Frequencies Let us assume for a moment that the users' voice signals $s^{(u)}(k)$ in the signal model Equation (2.7) are zero-mean white Gaussian noise. Henceforth, we separate the above signal model Equation (2.7) in a noise part and a useful signal part. The noise part is made up of the additive white Gaussian noise and the users' voice signals assumed also white, see above. The useful signal part is made up of the DSB-AM carriers only. From this point of view, the receive signal r(k) from the signal model Equation (2.7) can be rewritten $$r(k)=s(k)+q(k) \quad (3.25)$$

with the useful signal part $$s(k) = \sum_{u=1}^{U} 1 \cdot a^{(u)} \cdot e^{j \cdot \phi^{(u)}} \cdot e^{j \cdot 2\pi \cdot \Delta f^{(u)} \cdot k \cdot T_s} \quad (3.26)$$

and a white noise part $$q(k) = \sum_{u=1}^{U} m^{(u)} \cdot s^{(u)}(k) \cdot a^{(u)} \cdot e^{j \cdot \phi^{(u)}} \cdot e^{j \cdot 2\pi \cdot \Delta f^{(u)} \cdot k \cdot T_s} + n(k). \quad (3.27)$$

Taking into account an infinite number of samples in the time domain, the DTFT can be written $$R(e^{j2\pi \cdot f \cdot T_s}) = S(e^{j2\pi \cdot f \cdot T_s}) + Q(e^{j2\pi \cdot f \cdot T_s}) \quad (3.28)$$

$$= \sum_{u=1}^{U} 1 \cdot a^{(u)} \cdot e^{j \cdot \phi^{(u)}} \cdot$$

$$\delta(2\pi \cdot (f - \Delta f^{(u)}) \cdot T_s) + Q(e^{j2\pi \cdot f \cdot T_s})$$

For a finite number data sequence $\{r_w(k)\}_{k=0}^{N_{data}-1}$, the DTFT can be written $$R_w(e^{j2\pi \cdot f \cdot T_s}) = S_w(e^{j2\pi \cdot f \cdot T_s}) + Q_w(e^{j2\pi \cdot f \cdot T_s}) \quad (3.29)$$

$$= \sum_{u=1}^{U} 1 \cdot a^{(u)} \cdot e^{j \cdot \phi^{(u)}} \cdot$$

$$W(e^{j2\pi \cdot (f - \Delta f^{(u)}) \cdot T_s}) + Q_w(e^{j2\pi \cdot f \cdot T_s})$$

where $r_w(k)=r(k) \cdot w(k)$ is the windowed time signal. w(k) is the time domain window with finite support, $W(e^{j2\pi \cdot f \cdot T_s})$ is the DTFT of w(k).

In addition, we assume that uniform prior probability distributions are assigned to the parameter vectors $\underline{b}=[b^{(1)}, b^{(2)}, \ldots, b^{(U)}]^T$ and $\underline{f}=[\Delta f^{(1)}, \Delta f^{(2)}, \ldots, \Delta f^{(U)}]^T$ and the detector not only detects the tones, but also estimates the corresponding frequencies, then the Generalized Likelihood Ratio Detector (GLRD), which uses the Maximum Likelihood (ML) joint estimates of $\underline{b}$ and $\underline{f}$, is the optimum detector [WHA71].

Then, for a single tone (U=1), the signal model Equation (3.25) or Equation (3.28) consists only of a single spectral line and additive white Gaussian noise n(k) The single spectral line is due to the carrier of this user. The power of the spectral line is $(a^{(1)})^2=|b^{(1)}|^2$, and the power of the total additive white Gaussian noise is $\sigma_q^2$. The total noise power assuming voice signals $s^{(u)}(k)$ to be noise is $$\sigma_q^2 = \sigma_n^2 + \sum_{u=1}^{U} (\sigma_s^{(u)})^2, \quad (3.30)$$

where the white Gaussian noise power of n(k) and the power of the users' voice signals $s^{(u)}(k)$, weighted by modulation index and channel gain, add up.

The noise power $(\sigma_s^{(u)})^2$ is defined $$(\sigma_s^{(u)})^2 = (m^{(u)} \cdot a^{(u)})^2 \cdot E\{|s^{(u)}(k)|^2\}. \quad (3.31)$$

The ML estimate is then the value of $\Delta \hat{f}^{(1)}$ that maximizes the magnitude $|R_w(e^{j2\pi \cdot f \cdot T_s})|$ of the Discrete Time Fourier Transform (DTFT)

$$R_w(e^{j2\pi \cdot f \cdot T_s}) = \sum_{k=-0}^{N_{data}-1} r(k) \cdot w(k) \cdot e^{-j2\pi \cdot f \cdot T_s k} \quad (3.32)$$

as well as its scaled squared magnitude $|R_w(e^{j2\pi \cdot f \cdot T_s})|^2$, termed periodogram $C_w(e^{j2\pi \cdot f \cdot T_s})$ with $$C_w(e^{j2\pi \cdot f \cdot T_s}) = \frac{1}{N_{data}} |R_w(e^{j2\pi \cdot f \cdot T_s})|^2. \quad (3.33)$$

Here, w(k) is the window function with support only for $k \geq 0$ and $k < N_{data}$, $k \in \mathbb{Z}$. An example is the rectangular window function $$w_R(k) = \begin{cases} 1 & \text{for } 0 \leq k \leq N_{data} - 1 \\ 0 & \text{else} \end{cases} \quad (3.34)$$

that cuts out $N_{data}$ samples out of the data signal r(t) after sampling with the sampling rate. Thus, the estimator has only $N_{data}$ receive samples available for detection, so a finite window of samples. Denoting the strongest user's frequency offset by $\Delta f_{p_1}$, this peak $p_1$ has the largest magnitude in the noiseless spectrum and is likely to be the largest magnitude in the noisy spectrum, thus, will be detected with high probability if the SNR is sufficient.

A classical GLRD that decides if a single user having a single spectral line is present (hypothesis true), or noise only (hypothesis false), would decide for hypothesis true if the maximum of the periodogram divided by the noise variance estimate $\hat{\sigma}_q^2$ exceeds a threshold $\gamma_s^2$:

$$\frac{C_w(e^{j2\pi \cdot f \cdot T_s})}{\hat{\sigma}_q^2} \overset{true}{\underset{false}{\gtrless}} \gamma_s^2. \quad (3.35)$$

However, we are interested to detect two or more tones corresponding to two or more spectral lines. It is shown in [RBY76] that the ML detection of any spectral line can be carried out as if it were the only spectral line present, provided that the separation in frequency between it and any other spectral line is much larger than the frequency spacing of approximately $f_s/N_{data}$. If the frequency difference between the carriers exceeds this value, we call the frequency separation widely separated.

Because it is not known which user belongs to which detected peak, and $b^{(u)}$ is unknown at the receiver, the complex peak magnitude has to be estimated also. Henceforth, we denote by $a_{p_i}$, $\phi_{p_i}$ and $\Delta f_{p_i}$ the amplitude, phase and frequency of the detected peak i, i=1, 2, . . . .

The i-th frequency offset $\Delta f_{p_i}$ can be estimated in the following fashion:

$$\Delta \hat{f}_{p_i} = \underset{f}{\mathrm{argmax}} \left| \sum_{k=0}^{N_{data}-1} r(k) \cdot w(k) \cdot e^{-j2\pi \cdot f \cdot k \cdot T_s} \right|^2. \qquad (3.36)$$

When using the DFT, so estimating the frequency offset $\Delta f_{p_i}$ and the complex gain $b_{p_i}$ on a discrete frequency grid, zero padding of the windowed signal in the time domain leads to a better estimate due to a denser frequency grid. The coarse frequency estimate is $$\Delta \hat{f}_{p_i,coarse} = \begin{cases} \dfrac{f_s}{N_{FFT}} \cdot \hat{n}_{bin} & \text{for } 0 \leq n_{bin} \leq 0.5 \cdot N_{FFT} - 1 \\ \dfrac{f_s}{N_{FFT}} \cdot (N_{FFT} - \hat{n}_{bin}) & \text{else} \end{cases} \qquad (3.37)$$

where $$\hat{n}_{bin} = \underset{n}{\mathrm{argmax}} \left| \sum_{k=0}^{N_{data}-1} r(k) \cdot w(k) \cdot e^{-j2\pi \cdot n \cdot k / N_{FFT}} \right|^2$$

is the maximum bin index of the discrete frequency-grid. Another, less complex approach is to use interpolation for the estimation of $\Delta \hat{f}_{p_i}$ and $\hat{b}_{p_i}$. The carrier frequency offset $\Delta \hat{f}_{p_i}$ of the i-th peak can be written $$\Delta \hat{f}_{p_i} = \Delta \hat{f}_{p_i,coarse} + \hat{\Delta} \cdot f_s / N_{FFT} = (\hat{n}_{bin} + \hat{\Delta}) \cdot f_s / N_{FFT}, \qquad (3.38)$$

where $-0.5 \leq \hat{\Delta} < 0.5$ and $\Delta \hat{f}_{p_i,coarse}$ is given e.g. by Eq. (3.37). Thus, $\Delta$ accounts for the distance of the true peak from the maximum displayed grid sample, and $\hat{\Delta}$ is the estimate of $\Delta$.

Other approaches exist, the literature is very rich here. The i-th amplitude $a_{p_i}$ and phase $\phi_{p_i}$ can be estimated:

$$\hat{b}_{p_i} = \sum_{k=0}^{N_{data}-1} r(k) \cdot w(k) \cdot e^{-j2\pi \cdot \Delta f_{p_i} \cdot k \cdot T_s}, \qquad (3.39)$$

$$\hat{a}_{p_i} = |\hat{b}_{p_i}|, \quad \hat{\phi}_{p_i} = \arg(\hat{b}_{p_i}). \qquad (3.40)$$

In order to detect each spectral line separately, we shall evaluate its influence on the spectrum here. The DTFT of a spectral line $$a_{p_i} \cdot e^{j\phi_{p_i}} \cdot e^{j2\pi \cdot \Delta f_{p_i} \cdot k \cdot T_s}$$

belonging to a user after a finite time-windowing by w(k) can be easily computed to be $$R_{line}(e^{j2\pi \cdot f \cdot T_s}) = \sum_{k=0}^{N_{data}-1} a_{p_i} \cdot e^{j\phi_{p_i}} \cdot e^{j2\pi \cdot \Delta f_{p_i} \cdot k \cdot T_s} \cdot w(k) \cdot e^{-j2\pi \cdot f \cdot T_s k} \qquad (3.41)$$

$$= a_{p_i} \cdot e^{j\phi_{p_i}} \cdot \sum_{k=0}^{N_{data}-1} w(k) \cdot e^{j2\pi \cdot (\Delta f_{p_i} - f) \cdot k \cdot T_s}$$

$$= a_{p_i} \cdot e^{j\phi_{p_i}} \cdot W(e^{j2\pi \cdot (f - \Delta f_{p_i}) \cdot T_s}).$$

E.g., in case of a rectangular window, we have $$W(e^{j2\pi \cdot (f - \Delta f_{p_i}) \cdot T_s}) = W_R(e^{j2\pi \cdot (f - \Delta f_{p_i}) \cdot T_s}) \qquad (3.42)$$

$$= e^{-j\pi \cdot (f - \Delta f_{p_i}) \cdot T_s \cdot (N_{data} - 1)} \cdot \frac{\sin(\pi \cdot (f - \Delta f_{p_i}) \cdot T_s \cdot N_{data})}{\sin(\pi \cdot (f - \Delta f_{p_i}) \cdot T_s)}.$$

In an implementation, the obvious approach is to compute $R_w(e^{j2\pi \cdot f \cdot T_s})$ on a discrete frequency grid of frequencies $f_n$ spaced $f_s/N_{data}$ apart $$f_n = n \cdot f_s / N_{data} \qquad (3.43)$$

employing the DFT:

$$R_w(n) = R_w(e^{j2\pi \cdot f \cdot T_s})|_{f=f_n=n \cdot f_s/N_{data}}. \qquad (3.44)$$

For each single spectral line, we have the contribution to the spectrum $$R_{line}(n) = R_{line}(e^{j2\pi \cdot f \cdot T_s})|_{f=f_n=n \cdot f_s/N_{data}} \qquad (3.45)$$

$$= a_{p_i} \cdot e^{j\phi_{p_i}} \cdot W(e^{j2\pi \cdot (n/N_{data} - \Delta f_{p_i} T_s)}).$$

Its estimate is $$\hat{R}_{line}(n) = \hat{a}_{p_i} \cdot e^{j\hat{\phi}_{p_i}} \cdot W(e^{j2\pi \cdot (n/N_{data} - \Delta \hat{f}_{p_i} T_s)}). \qquad (3.46)$$

E.g., in case of a rectangular window $w(k)=w_R(k)$, we have as a special case the DTFT $$W(e^{j2\pi \cdot (n/N_{data} - \Delta f_{p_i} T_s)}) = W_R(e^{j2\pi \cdot (n/N_{data} - \Delta f_{p_i} T_s)}) = \qquad (3.47)$$

$$e^{-j\pi \cdot (n/N_{data} - \Delta f_{p_i} T_s) \cdot (N_{data} - 1)} \cdot \frac{\sin(\pi \cdot (n/N_{data} - \Delta f_{p_i} \cdot T_s) \cdot N_{data})}{\sin(\pi \cdot (n/N_{data} - \Delta f_{p_i} \cdot T_s))}.$$

The magnitude of the maximum peak observed depends upon its position on the discrete frequency grid. If the peak is on a DFT bin, it is maximum. If the peak is not on the discrete frequency grid, the peak magnitude is diminished. If it is between two bins, it has a worse case degradation.

E.g. for a rectangular window, if $\Delta f_{p_i}$ is an integer multiple $n_x$ of the frequency separation $f_s/N_{data}$ (termed the 'on bin' case):

$$\Delta f_{p_i} = n_x \cdot f_s / N_{data}, \qquad (3.48)$$

then $$R_{line}(n_x) = a_{p_i} \cdot e^{j\phi_{p_i}} \cdot N_{data}. \qquad (3.49)$$

If $\Delta f_{p_i}$ is exactly positioned between two bins $$\Delta f_{p_i} = (n_y + 0.5) \cdot f_s / N_{data}, \qquad (3.50)$$

which is termed the 'off bin' case, then the maximum spectral peak in $R_{line}(n)$ is only approximately $$R_{line}(n_y) = a_{p_i} \cdot e^{j\phi_{p_i}} \cdot N_{data} \cdot \frac{2}{\pi} \approx a_{p_i} \cdot e^{j\phi_{p_i}} \cdot N_{data} \cdot 0.64. \qquad (3.51)$$

For this reason, if the peak falls between two bins, the detection probability decreases, when the peak is searched in strong noise, so with a peak having small distance to the noise floor. The loss in detection probability can be diminished by zero padding the data $r(k)$ by a zero padding factor $L_{ZP} = N_{FFT}/N_{data}$, so that $N_{FFT} - N_{data}$ trailing zeros are appended to the (windowed) $r(k)$ prior to the DFT of length $N_{FFT}$, instead of directly performing a DFT of length $N_{data}$ on $r(k)$. The frequency resolution $\Delta f_{res}$ obtained with a DFT of length $N_{data}$ is the same as the DFT of length $N_{FFT}$ of the zero padded sequence and is $$\Delta f_{res} = \frac{f_s}{N_{data}}. \qquad (3.52)$$

That is, the frequency resolution is not improved by zero padding [STO05]. However, the amplitude resolution gets finer using zero padding, and the worst 'off bin' case with zero padding is now better than without zero padding, because the window-dependent spectral lobe of the peak is sampled spectrally with a finer frequency grid. The zero-padded discrete Fourier spectrum is then $$R_{line}(n) = R_{line}(e^{j2\pi f \cdot T_s})|_{f=f_n=f_s \cdot n/N_{FFT}} \qquad (3.53)$$
$$= a_{p_i} \cdot e^{j\phi_{p_i}} \cdot W(e^{j2\pi (n/N_{FFT} - \Delta f_{p_i} T_s)}).$$

E.g., in case of a rectangular window, we have $$W(e^{j2\pi(n/N_{FFT} - \Delta f_{p_i} T_s)}) = W_R(e^{j2\pi(n/N_{FFT} - \Delta f_{p_i} T_s)}) = \qquad (3.54)$$
$$e^{-j\pi \cdot (n/N_{FFT} - \Delta f_{p_i} \cdot T_s)(N_{data}-1)} \cdot \frac{\sin(\pi \cdot (n/N_{FFT} - \Delta f_{p_i} \cdot T_s) \cdot N_{data})}{\sin(\pi \cdot (n/N_{FFT} - \Delta f_{p_i} \cdot T_s))}.$$

Thus, the discrete Fourier spectrum becomes $$R_{line}(n) = R_{line}(e^{j2\pi f \cdot T_s})|_{f=f_n=n \cdot f_s/N_{FFT}, \Delta f_{p_i} = (n_{bin} + \Delta) \cdot f_s/N_{FFT}} \qquad (3.55)$$
$$= a_{p_i} \cdot e^{j\phi_{p_i}} \cdot W(e^{j2\pi \cdot (n/N_{FFT} - (n_{bin} + \Delta)/N_{FFT})}).$$

Its estimate is $$\hat{R}_{line}(n) = \hat{a}_{p_i} \cdot e^{j\hat{\phi}_{p_i}} \cdot W(e^{j2\pi \cdot (n/N_{FFT} - (\hat{n}_{bin} + \hat{\Delta})/N_{FFT})}). \qquad (3.56)$$

E.g., in case of a rectangular window, we have $$W(e^{j2\pi \cdot (n/N_{FFT} - (n_{bin} + \Delta)/N_{FFT})}) = W_R(e^{j2\pi \cdot (n/N_{FFT} - (n_{bin} + \Delta)/N_{FFT})}) \qquad (3.57)$$
$$= e^{-j\pi \cdot (n - (n_{bin} + \Delta))/N_{FFT} \cdot (N_{data} - 1)} \cdot$$
$$\frac{\sin(\pi \cdot (n - (n_{bin} + \Delta))/N_{FFT} \cdot N_{data})}{\sin(\pi \cdot (n - (n_{bin} + \Delta))/N_{FFT})}.$$

If $R_{line}(n)$ in Equation (3.55) stems from a rectangularly windowed spectral line, so no weighting in the time domain at all, just cutting the samples out of the data stream $r(k)$, the discrete Fourier spectrum of this finite number or received samples results. If a window is used, the spectrum is Equation (3.55) with the sampled DTFT of the corresponding window used, instead of the rectangular window stated in Equation (3.57).

Now, as stated above, the influence of each spectral line on the spectrum can be evaluated by simply subtracting the (windowed) peak from the spectrum. E.g., in case of a rectangular window, the so called Dirichlet-Kernel $$D(n) = e^{-j\pi \cdot n/N_{FFT} \cdot (N_{data} - 1)} \cdot \frac{\sin(\pi \cdot n/N_{FFT} \cdot N_{data})}{\sin(\pi \cdot n/N_{FFT})} \qquad (3.58)$$

has to be weighted as in Equation (3.55) and has to be subtracted after having it shifted from its conjugate symmetric position about the bin zero by $n_{bin} + \Delta$ to the appropriate fractional bin index:

$$W_R(e^{j2\pi \cdot (n/N_{FFT} - (n_{bin} + \Delta)/N_{FFT})}) = D(n - (n_{bin} + \Delta)) \qquad (3.59)$$
$$= e^{-j\pi \cdot (n - (n_{bin} + \Delta))/N_{FFT} \cdot (N_{data} - 1)} \cdot$$
$$\frac{\sin(\pi \cdot (n - (n_{bin} + \Delta))/N_{FFT} \cdot N_{data})}{\sin(\pi \cdot (n - (n_{bin} + \Delta))/N_{FFT})},$$

see Equation (3.55) and Equation (3.57) for comparison. Equation (3.55) consists of the sampled DTFT of the window function, which is in just a shifted Dirichlet kernel in case of a rectangular window, which is weighted by the (complex) peak magnitude $$a_{p_i} \cdot e^{j\phi_{p_i}},$$

and the whole term is spectrally shifted to the corresponding frequency $\Delta f_{p_i}$, which is sampled to the DFT grid.

Clearly, a non-parametric method based on the DFT can also detect multiple peaks by subtracting the effect of the peak in order to reduce the interference resulting from spectral leakage when detecting the second strongest peak, and optionally also less stronger peaks, until all peaks are taken into account for detection. Spectral leakage leads to bias when estimating the frequencies.

If the periodogram is used for spectral detection of peaks, see In particular, FIG. 2 c), $$\hat{C}_{line}(n) = \frac{1}{N_{data}} \cdot |\hat{R}_{line}(n)|^2 = \frac{1}{N_{data}} \cdot (\hat{a}^{(u)})^2 \cdot |W(e^{j2\pi \cdot (n/N_{FFT} - (\hat{n}_{bin} + \hat{\Delta})/N_{FFT})})|^2$$

has to be subtracted, if the magnitude spectrum is used for the detection of peaks, $|\hat{R}_{line}(n)| = \hat{a}^{(u)} \cdot |W(e^{j2\pi \cdot (n/N_{FFT} - (\hat{n}_{bin} + \hat{\Delta})/N_{FFT})})|$ has to be subtracted.

An alternative approach to peak detection is to compute the notch periodogram for detection of weaker DSB-AM carriers, where all stronger peaks are notched out in the notch periodogram, removing their influence from the periodogram. One peak after the other can be subtracted in this fashion, until no significant peak is left. The notch periodogram that notches out an estimated peak at $\Delta f_{p_i}$ is computed:

$$P_{notch}(f, \Delta \hat{f}_{p_1}) = \frac{1}{N'(f - \Delta \hat{f}_{p_1})} \cdot |\underline{d}^H(f) \cdot \underline{P}^\perp_{\underline{d}(\Delta \hat{f}_{p_1})}(\Delta \hat{f}_{p_1}) \cdot \underline{r}|^2 \quad (3.60)$$

with $$\underline{d}(f) = \left[e^{-j2\pi 0}, e^{-j2\pi \frac{1}{N_{FFT}}}, e^{-j2\pi \frac{2}{N_{FFT}}}, \ldots, e^{-j2\pi \frac{N_{FFT}-1}{N_{FFT}}}\right]^T, \quad (3.61)$$

$$\underline{r} = [r(0), r(1), r(2), \ldots, r(N_{data}-1), \underline{0}_{N_{FFT}-N_{data}}]^T, \quad (3.62)$$

$\underline{0}_{N_{FFT}-N_{data}}$ a vector of $N_{FFT}-N_{data}$ zeros to allow for optional zero padding, and $$\underline{P}^\perp_{\underline{d}(\Delta \hat{f}_{p_1})}(\Delta \hat{f}_{p_1}) = I - \underline{d}(\Delta \hat{f}_{p_1}) \cdot (\underline{d}^H(\Delta \hat{f}_{p_1}) \cdot \underline{d}(\Delta \hat{f}_{p_1}))^{-1} \cdot \underline{d}^H(\Delta \hat{f}_{p_1}). \quad (3.63)$$

The term $$\underline{d}^H(f) \cdot \underline{P}^\perp_{\underline{d}(\Delta \hat{f}_{p_1})}(\Delta \hat{f}_{p_1}) \cdot \underline{r}$$

in equation Eq. (3.60) can be rewritten $$(3.64)$$

$$\underline{P}^\perp_{\underline{d}(\Delta \hat{f}_{p_1})}(\Delta \hat{f}_{p_1}) \cdot \underline{r} = DTFT_{N_{data}}\{\underline{P}^\perp_{\underline{d}(\Delta f_{p_1})}(\Delta \hat{f}_{p_1}) \cdot \underline{r}\}$$

$$= DTFT_{N_{data}}\{\underline{r}\} - \underbrace{\frac{\underline{d}(\Delta \hat{f}_{p_1})}{N_{data}}}_{\text{scaled complex exponential with } f = \Delta \hat{f}_{p_1}} \cdot \underbrace{DTFT_{N_{data}}\{\underline{r}\}|_{f = \Delta \hat{f}_{p_1}}}_{\text{spectral peak at } f = \Delta \hat{f}_{p_1}}$$

subtract spectral peak at $f = \Delta \hat{f}_{p_1}$ $$= R_w(e^{j2\pi \cdot f \cdot T_s}) - R_{line}(e^{j2\pi \cdot f \cdot T_s})$$

$$= R_w(e^{j2\pi \cdot f \cdot T_s}) - \hat{a}_{p_i} \cdot e^{j\hat{\phi}_{p_i}} \cdot W(e^{j2\pi \cdot (f - \Delta \hat{f}_{p_i}) T_s})$$

and after sampling with $f = f_n = n \cdot f_s/N_{data}$ $$\underline{d}^H(n) \cdot \underline{P}^\perp_{\underline{d}(\Delta \hat{f}_{p_1})}(\Delta \hat{f}_{p_1}) \cdot \underline{r} = R_w(n) - \hat{a}_{p_i} \cdot e^{j\hat{\phi}_{p_i}} \cdot \quad (3.65)$$

$$W(e^{j2\pi \cdot (n/N_{data} - \Delta \hat{f}_{p_i} T_s)})$$

$$= R_w(n) - R_{line}(n)$$

or, using zero padding and an FFT of size $N_{FFT}$ to have a finer grid $f = f_n = n \cdot f_s/N_{FFT}$ in the frequency domain $$\underline{d}^H(n) \cdot \underline{P}^\perp_{\underline{d}(\Delta \hat{f}_{p_1})}(\Delta \hat{f}_{p_1}) \cdot \underline{r} = R_w(n) - \hat{a}_{p_i} \cdot e^{j\hat{\phi}_{p_i}} \cdot \quad (3.66)$$

$$W(e^{j2\pi \cdot (n/N_{FFT} - \Delta \hat{f}_{p_i} T_s)})$$

$$= R_w(n) - R_{line}(n)$$

so that:

$$P_{notch}(n, \Delta \hat{f}_{p_1}) = \frac{1}{N'(n - \Delta \hat{f}_{p_1} \cdot T_s \cdot N_{FFT})} \cdot |R_w(n) - R_{line}(n)|^2 \quad (3.67)$$

with:

$$(3.68)$$

$$N'(n - \Delta \hat{f}_{p_i} \cdot T_s \cdot N_{FFT}) = N_{data} - N_{data} \cdot$$

$$\left|\frac{\sin\left(\frac{2\pi \cdot (f - \Delta \hat{f}_{p_i}) T_s \cdot N_{data}}{2}\right)}{N_{data} \cdot \sin\left(\frac{2\pi \cdot (f - \Delta \hat{f}_{p_i}) T_s}{2}\right)}\right|^2_{f = f_n = n \cdot f_s/N_{FFT}}$$

$$= N_{data} - N_{data} \cdot$$

$$\left|\frac{\sin\left(\pi \cdot \left(\frac{n \cdot N_{data}}{N_{FFT}} - \Delta \hat{f}_{p_i} \cdot T_s \cdot N_{data}\right)\right)}{N_{data} \cdot \sin\left(\pi \cdot \left(\frac{n}{N_{FFT}} - \Delta \hat{f}_{p_i} \cdot T_s\right)\right)}\right|^2.$$

The peak subtraction can be iterated to start all over after the last peak is detected, using a refined noise floor estimate and subtracting all peaks except that currently estimated. Or the peak subtraction can be performed interleaved, so that after each peak is detected, all or some previous peaks are re-estimated, before proceeding to the next peak.

Figure 3:
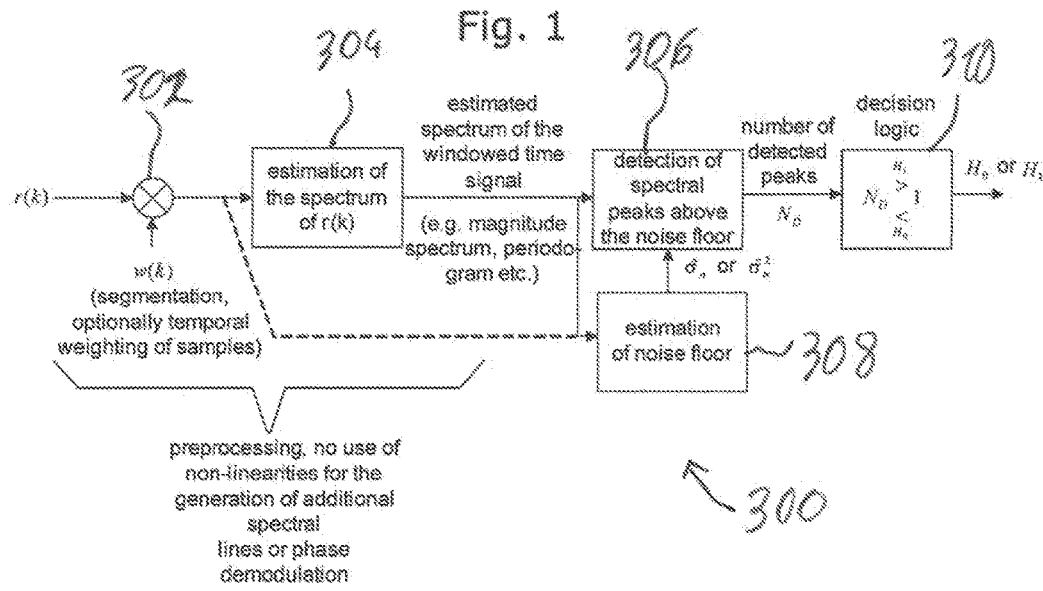
FIG. 3 shows an overall detection scheme based on the detection of spectral lines belonging to DSB-AM signals.

FIG. 3 shows an overall detection scheme based on the detection of spectral lines belonging to DSB-AM signals. The noise variance can either be estimated from the time domain signal or from the spectral estimate.

According to an embodiment, the detection scheme is provided by a signal processing chain 300 illustrated in FIG. 3. The signal processing may comprise a segmentation unit 302 for segmenting (windowing) the receive signal r(k) and optional temporal weighting of samples. In accordance with an embodiment, the processing chain 300 further comprises a spectrum estimator 304 for estimation of the spectrum of r(k). In accordance with a further embodiment, the processing chain 300 further comprises a peak detector 306 for detection of spectral peaks above the noise floor. For estimation of the noise floor, a noise estimator 308 may be provided.

The number of detected peaks $N_D$ is reported to a decision logic 310 that decides $$N_D \underset{H=H_0}{\overset{H=H_1}{\underset{\leq}{>}}} 1, \qquad (3.69)$$

see FIG. 3. Upon decision for $H_1$, the double transmission detection can be signalled to the air traffic controller.

Now, if we drop the assumption made above of voice signals to be white, the AM voice sidebands appear in the spectrum as coloured noise. Specifically, an upper and a lower sideband about the carrier frequency are observable. The unmodulated carriers are only detected in case that they are not hidden in the AM sidebands. So, the peak detection just described will work only for moderate power differences between the users.

Because spectral lines separated widely in frequency have limited influence on one another, a test for widely separated spectral lines can be carried out successively as follows:

A 2-Step Procedure for Detection of Widely Spaced DSB-AM Signals

Step 1:

Estimate the spectrum of $r(k)$ using windowed, optionally averaged over multiple segments, optionally zero padded and optionally scaled versions of Fourier-related, subspace vector-related, or Wavelet related spectral estimates, see In particular, FIG. 2. Result: E.g. $R_w(n)$, $|R_w(n)|$, $|R_w(n)|^2$, $C_w(n)$, or a high resolution pseudo spectrum (as it is obtained e.g. for the ESPRIT algorithm). For parametric methods, a model is postulated first, e.g. as in Burg's method. For subspace Eigen-analysis based spectral estimation methods such as MUSIC and ESPRIT, a high resolution spectral estimate or at least a pseudo-spectrum can be computed.

Step 2:

Detection of the peak $p_i = p_1$ in the spectral estimate of $r(k)$ that has the highest magnitude. For non-parametric methods, this is typically carried out by finding the maximum of the DFT magnitude $|R_w(n)|$, squared magnitude $|R_w(n)|^2$ or $C_w(n)$, compare Equation (3.38).

Step 3:

The noise floor can be estimated by well known techniques, e.g. as disclosed in R. Martin, "Noise Power Spectral Density Estimation Based on Optimal Smoothing and Minimum Statistics," *IEEE Transaction on speech and audio processing, Vol. 9, No. 5, July 2001* ([RM01]) and the references therein. A simple estimate is obtained by averaging the spectral estimate over parts including only noise. Advanced techniques allow for the estimation of the colored, frequency dependent noise floor $\hat{\sigma}_q = \hat{\sigma}_q(e^{j2\pi f T_s})$. The resolution of the noise floor to the bin-spacing obtained by a DFT shall normally be sufficient: $\hat{\sigma}_q = \hat{\sigma}_q(n)$.

Step 4:

Decide if the strongest peak is significant, i.e., if it has a magnitude high enough above the noise floor. E.g. for non-parametric methods, the test for significance may be $$\frac{\hat{a}_{p_1} \cdot N_{data}}{\hat{\sigma}_q} \underset{p_1 \, not \, significant}{\overset{p_1 \, significant}{\underset{<}{>}}} \gamma_1 \text{ or} \qquad (3.70)$$

$$\frac{\hat{a}_{p_1}^2 \cdot N_{data}^2}{\hat{\sigma}_q^2} \underset{p_1 \, not \, significant}{\overset{p_1 \, significant}{\underset{<}{>}}} \gamma_1^2$$

and $a_{p_1}$ can be estimated from Equation (3.40), or, if assumed sufficient for the application, the highest magnitude DFT-peak is used as a coarse estimate. E.g. for parametric methods, the estimate $\hat{a}_{p_1}$ can be taken from Equation (3.40) or from a suitably computed pseudo-spectrum that maintains the relative amplitude difference between signal and noise floor.

If the significance test shows a significant peak, then proceed, because $N_D > 0$ and, thus, H might be unequal to $N_D = 0$ otherwise $N_D = 0$.

Step 5:

In case of non-parametric methods, the bin index belonging to the highest magnitude peak is a coarse frequency estimate. Perform a fine frequency estimation to yield $\Delta \hat{f}_{p_1}$, e.g. by using interpolation between the DFT frequency bins (J. Schoukens, R. Pintelon, H. van Hamme, "The interpolated Fast Fourer Transform: A comparative study," *IEEE Transaction on instrumentation and measurement, Vol. 41, No. 2, April 1992* ([Schou92])), see Equation (3.38), or by linear regression of DFT phases (S. M. Kay, "A fast and accurate single frequency estimator", *IEEE Transactions on Acoustics, Speech and Signal Processing* 37, 1987}1990 ([Kay89])), or by using weighted linear regression of DFT phases, as done by the Weighted Phase Averaging (WPA) technique (S. Umesh, D. Nelson, "Computationally Efficient Estimation of Sinusoidal Frequency at Low SNR", *Proceedings of the 1996 IEEE International Conference on Acoustics Speech and Signal Processing*, Atlanta (Ga.), 2797}2800 ([Ume06])). For parametric methods, this step can be omitted.

Step 6:

Perform removal of the strongest tone from the data in the time or frequency domain, e.g. by one of the following three methods (removal in the time domain, removal in the frequency domain and removal after demodulation in the time domain):

The removal in the time domain without demodulation means a subtraction of the sequence $$\left\{ \hat{a}_{p_i} \cdot e^{j \hat{\phi}_{p_i}} \cdot w(k) \cdot e^{j \cdot 2 \pi \cdot \Delta \hat{f}_{p_i} \cdot k \cdot T_s} \right\}_{k=0}^{N_{data}-1}$$

from $\{r_w(k)\}_{k=0}^{N_{data}-1}$ to get the receive signal that is cleaned from the strongest carrier $$\{r_{clean,1}(k)\}_{k=0}^{N_{data}-1} = \qquad (3.71)$$

$$\{r_w(k)\}_{k=0}^{N_{data}-1} - \left\{ \hat{a}_{p_i} \cdot e^{j \hat{\phi}_{p_i}} \cdot w(k) \cdot e^{j \cdot 2 \pi \cdot \Delta \hat{f}_{p_i} \cdot k \cdot T_s} \right\}_{k=0}^{N_{data}-1}$$

It is well suited for model based techniques and high resolution techniques, where the time-domain auto-correlation estimates need to be computed again after this removal. A new spectral estimate can be computed from the signal $\{r_{clean,1}(k)\}_{k=0}^{N_{data}-1}$, where the carrier of the strongest DSB-AM signal is now removed with high approximation.

The removal in the frequency domain without demodulation depends on the spectral representation used. E.g., the complex spectrum $R_w(n)$, the magnitude spectrum $|R_w(n)|$, the periodogram $C_w(n)$, the pseudospectrum or any scaled versions of the later might be used. It means to do from $R_w(n)$ a subtraction of $\hat{R}_{line}(n)$, alternatively $|\hat{R}_{line}(n)|$ from the magnitude spectrum $|R_w(n)|$, alternatively $\hat{C}_{line}(n)$ of $C_w(n)$, alternatively by using the notch periodogram Eq. (3.67) to remove the strongest carrier.

Alternatively, the signal r(k) can be demodulated prior to removal by the estimated frequency and phase to yield $r_{de\ mod,coh,1}(k)$ or $r_{de\ mod,incoh,1}(k)$, where $$\{r_{de\,mod,coh,1}(k)\}_{k=0}^{N_{data}-1} = \{r(k) \cdot e^{-j\hat{\phi}_{p_i}} \cdot e^{-j2\pi\cdot\Delta\hat{f}_{p_i}\cdot k\cdot T_s}\}_{k=0}^{N_{data}-1} \quad (3.72)$$

and $$\{r_{de\,mod,incoh,1}(k)\}_{k=0}^{N_{data}-1} = \{r(k) \cdot e^{-j2\pi\cdot\Delta\hat{f}_{p_i}\cdot k\cdot T_s}\}_{k=0}^{N_{data}-1}. \quad (3.73)$$

Removal of the strongest tone from the demodulated data in the time domain means removal of the DC component now, which can easily be estimated, e.g.

$$\hat{r}_{DC} = \frac{1}{N_{data}} \cdot \sum_{k=0}^{N_{data}-1} r_{de\,mod,incoh,1}(k) \quad (3.74)$$

so that we get $$r_{de\,mod,incoh,clean,1}(k) = r_{de\,mod,coh,1}(k) - \hat{r}_{DC}. \quad (3.75)$$

Of cause, $r_{de\ mod,coh,1}(k)$ could be employed instead of in Eq. (3.74), but the additional phase compensation is not required here and the phase estimation can be saved.

A new spectral estimate can be computed from the signal $\{r_{de\ mod,incoh,clean,1}(k)\}_{k=0}^{N_{data}-1}$, where in comparison to the original signal r(k) the carrier of the strongest DSB-AM signal is now removed with high approximation, only that the whole signal is demodulated now. This frequency shift needs to be taken into account especially for Multicarrier/CLIMAX mode to discriminate a multicarrier component from a secondary user.

Removal of the strongest peak from the demodulated data in the frequency domain means that the DFT $R_{de\ mod,coh,1}(n)$ or $R_{de\ mod,incoh,1}(n)$ respectively, has to be computed from the windowed, optionally zero padded $r_{de\ mod,coh,1}(k)$, or, $r_{de\ mod,incoh,1}(k)$, respectively, and a subtraction of the Dirichlet kernel $W_R$ ($e^{j2\pi\cdot(0/N_{FFT})}$) for the DFT of a single tone with rectangular window at frequency zero, or $W(e^{j2\pi\cdot(0/N_{FFT})})$ for the DFT of a single tone with arbitrary window at frequency zero, alternatively the absolute values $|W(e^{j2\pi\cdot(0/N_{FFT})})|$ from the magnitude spectrum $|R_{de\ mod,coh,1}(n)|$ or the squared absolute value $|W(e^{j2\pi\cdot(0/N_{FFT})})|^2$ from the squared magnitude spectrum $|R_{de\ mod,coh,1}(n)|^2$. When magnitude spectra are subtracted, it is sufficient to compute the spectrum from $r_{de\ mod,incoh,1}(k)$. The advantage of demodulation to a known frequency is that the spectrum of a peak at frequency zero that has to be subtracted can be pre-computed very easily. For the demodulation, estimation of the phase and its use in the demodulation is only required when $R_{de\ mod,coh,1}(n)$ is involved, not its magnitude.

The result after the subtraction of the peak in the time domain or the frequency domain is that the remaining spectrum is without the influence of the strongest peak. Alternatively to the procedure just described for the removal in the frequency domain, the notch periodogram can be computed. It means that when removing tones from the periodogram, the squared Dirichlet spectrum is weighted.

Step 6: Now, the second strongest peak can be computed from the data when the first peak is already removed. It also has to be tested for significance by comparing its magnitude to the noise floor. If the second strongest peak is also significant, $N_D=2$, else, $N_D=1$.

After step 5, the two strongest peaks are tested for significance. The coarse and fine frequency estimates of the second strongest peak can be computed as under step 3.

If the second strongest peak is significant in a non-CLIMAX environment, the detector shall trigger: $N_D=2$. If it is in a CLIMAX environment, the detector shall only trigger if not both peaks are in a CLIMAX frequency detection interval, see below, else: $N_D=1$.

The procedure for the detection of widely spaced DSB-AM signals by removal of the carrier part only just described is only suitable
- either for double transmissions that have similarly strong carriers,
- or for the detection of single, isolated CLIMAX components in noise, see below for the CLIMAX case.

Otherwise, the second strongest carrier might vanish in the AM sidebands of the strongest user.

Step 7: Decide for the hypothesis $H_1$ if $N_D$ else $H_0$:

$$N_D \underset{H=H_0}{\overset{H=H_1}{\gtrless}} 1,$$

see Equation (3.69).

3.5 Procedure for Multiple Peak Detection for DSB-AM Signals: Refinement for Closely Spaced Carrier Frequencies If we find a method to add to the case of widely separated frequencies a test for closely spaced frequencies, then we could use the non-parametric spectral estimation and detection method:

If the minimum frequency separation is larger than $f_s/N_{data}$, the unwindowed or windowed periodogram provides the basis for an excellent frequency estimation.

If the minimum frequency separation is smaller $f_s/N_{data}$, a hypothesis test might be carried out that performs a test on the presence of at least a second spectral line to judge in favor of $H_1$ when the periodogram fails to detect the secondary users due to the lack of widely separated spectral lines.

A DSB-AM signal with carrier has a small frequency gap between a carrier and each sideband. It can therefore be assumed that within this small bandwidth around the carrier, the valid signal model is that of a complex exponential in white Gaussian noise. Only outside this small bandwidth, there is 'colored noise', so noise with a non-flat spectrum, from the AM sidebands. In case of two almost overlapping DSB-AM sidebands, the carriers are approximately spaced up to $2 \cdot f_s/N_{data}$ apart. So, the $H_1$ hypothesis has a signal model of two complex exponentials in white Gaussian noise in the close spectral vicinity of the two overlapping carriers. Therefore, similar to the case of closely spaced sinusoids in white Gaussian noise, DSB-AM signals can be detected in the same way. One approach is to compute the notch periodogram, with a notch placed at the frequency estimate of the strongest peak, and to judge the remaining spectrum after the influence of the strongest peak is removed due to the notch. If the remaining spectrum is flat in the vicinity of the estimated frequency of the strongest peak, no second peak was present in the original spectrum, so $N_D=1$. If there are peaks (or valleys) in the remaining spectrum, there is (at least) a second peak in the original spectrum, and $N_D=2$. The detection region for this test shall cover approximately the frequency interval $2 \cdot f_s/N_{data}$. The number of bins depends on the zero padding factor employed, for no zero padding, there are three bins involved. If the largest peak within the detection region has significant magnitude above the noise floor, $N_D=2$, else $N_D=1$. The test can be expanded to more than two users by putting even more notch frequencies in the notch periodogram, but that is not the application here and not necessary, because two users mean a double transmission already. If the time signal is demodulated by the estimated maximum peak frequency, so that the peak appears at zero frequency, instead of using the maximum peak, the difference between the peak and its spectral component at the negative frequency can be used. The latter metric is more robust to interference close to the maximum frequency peak (the carrier of the strongest user).

The hypothesis test for closely spaced DSB-AM signals can be integrated in the above procedure for the detection of widely spaced DSB-AM signals by extending step 6 to a step 6a.

3.6 Procedure for Multiple Peak Detection for DSB-AM Signals Based on the Difference Spectrum Between Sidebands The users' voice signals are not white. Instead, they can be treated as colored noise. Being real-valued, we have already observed that certain symmetry conditions apply: There are approximate symmetric upper and lower sidebands centered about the carrier frequency. No matter how the complex equivalent IQ baseband Equation (2.7) is computed, its spectrum contains the superposition of multiple equivalent baseband DSB-AM signals $v^{(u)}(k)$. The above 2-Step-Detector can be modified insofar that not only the carriers, visible as spectral peaks, of the DSB-AM users are cancelled, but the whole voiced sidebands. This can be achieved by computation of the difference spectrum between the sidebands that for each user are approximately conjugate symmetric about the carrier frequency offset in IQ-baseband.

To be specific, we have observed that each users' useful signal component after phase correction by $\phi^{(u)}$ to get $v^{(u)}(k) \cdot e^{-j\phi^{(u)}}$ has a conjugate symmetric spectrum about the frequency $\Delta f^{(u)}$. Because we observe the first peak $p_1$, the equations have to be rewritten replacing the user index u by the peak index of the first peak, $p_1$.

For the first detected peak $p_1$, the component of the belonging user can be written:

$$v_{p_1}(k) = (1 + m_{p_1} \cdot s_{p_1}(k)) \cdot a_{p_1} \cdot e^{j\phi_{p_1}} \cdot e^{j \cdot 2\pi \cdot \Delta f_{p_1} \cdot k \cdot T_s}, \quad (3.76)$$

$$k = 0, 1, \ldots, N_{data} - 1.$$

The signal $v_{p_1}(k)$ has a conjugate symmetric Discrete Time Fourier Transform (DTFT) about $\Delta f_{p_1}$ after phase correction. This symmetry condition is stated in Equation (3.77). The phase $\phi_{p_1}$ that is required for the phase correction can be estimated, e.g. from the phase of the carrier of the DSB-AM signal. The carrier is present at $\Delta f_{p_1}$:

$$V_{p_1}\left(e^{j2\pi \cdot (\Delta f_{p_1} - f) \cdot T_s}\right) \cdot e^{-j\phi_{p_1}} = \left(V_{p_1}\left(e^{j2\pi \cdot (\Delta f_{p_1} + f) \cdot T_s}\right) \cdot e^{-j\phi_{p_1}}\right)^*, \quad (3.77)$$

where the DTFT $V_{p_1}(e^{j2\pi \cdot f \cdot T_s})$ is given by $$V_{p_1}(e^{j2\pi \cdot f \cdot T_s}) = \sum_{k=-\infty}^{\infty} v_{p_1}(k) \cdot e^{-j2\pi \cdot f \cdot T_s \cdot k} = \sum_{k=0}^{N_{data}-1} v_{p_1}(k) \cdot e^{-j2\pi \cdot f \cdot T_s \cdot k}. \quad (3.78)$$

The useful signal component of user u is real-valued after phase- and frequency offset compensation:

$$v_{p_1, de\, mod, coh, 1}(k) = \quad (3.79)$$
$$v_{p_1}(k) \cdot e^{-j\phi_{p_1}} \cdot e^{-j \cdot 2\pi \cdot \Delta f_{p_1} \cdot k \cdot T_s} = (1 + m_{p_1} \cdot s_{p_1}(k)) \cdot a_{p_1},$$
$$k = 0, 1, \ldots, N_{data} - 1.$$

Including the phase in the demodulation means that the signal is demodulated phase-coherently.

Thus, the DTFT of $v_{p_1, de\, mod, coh, 1}(k)$ is conjugate symmetric about frequency zero:

$$V_{p_1, de\, mod, coh, 1}(e^{j2\pi \cdot f \cdot T_s}) = V_{p_1, de\, mod, coh, 1}^*(e^{-j2\pi \cdot f \cdot T_s}). \quad (3.80)$$

The phase $\phi_{p_i}$ and the frequency offset $\Delta f_{p_i}$ that are required for the phase and frequency correction can be estimated, e.g. from the phase of the carrier of the DSB-AM signal. The carrier is present at $\Delta f^{(u)}$.

The useful signal component of user u can also be demodulated incoherently regarding the phase $\phi_{p_1}$:

$$v_{p_1, de\, mod, incoh, 1}(k) = \quad (3.81)$$
$$v_{p_1}(k) \cdot e^{-j \cdot 2\pi \cdot \Delta f_{p_1} \cdot k \cdot T_s} = (1 + m_{p_1} \cdot s_{p_1}(k)) \cdot a_{p_1} \cdot e^{j\phi_{p_1}},$$
$$k = 0, 1, \ldots, N_{data} - 1.$$

This is useful if only the magnitude spectrum shall be used for spectral subtraction.

Then, the DTFT can be written:

$$V_{p_1, de\, mod, incoh, 1}\left(e^{j2\pi \cdot (\Delta f_{p_1} - f) \cdot T_s}\right) \cdot e^{-j\phi_{p_1}} = \quad (3.82)$$
$$\left(V_{p_1, de\, mod, incoh, 1}\left(e^{-j2\pi \cdot (\Delta f_{p_1} + f) \cdot T_s}\right) \cdot e^{-j\phi_{p_1}}\right)^*.$$

Each users' signal component Equation (3.76) is frequency corrected to get $v_{p_1, de\, mod, incoh, 1}(k)$ as in Equation (3.81). It has a symmetric magnitude spectrum about the frequency zero and, therefore, a symmetric periodogram about the frequency zero:

The symmetry condition follows from Equation (3.82):

$$V_{p_1, de\, mod, incoh, 1}\left(e^{j2\pi \cdot (\Delta f_{p_1} - f) \cdot T_s}\right) \cdot e^{-j\phi_{p_1}} = \quad (3.83)$$
$$\left(V_{p_1, de\, mod, incoh, 1}\left(e^{j2\pi \cdot (\Delta f_{p_1} - f) \cdot T_s}\right) \cdot e^{-j\phi_{p_1}}\right)^* \Rightarrow$$

-continued
$$|V_{p_1,demod,incoh,1}(e^{j2\pi\cdot(\Delta f_{P_1}-f)\cdot T_s})| =$$
$$|V_{p_1,demod,incoh,1}(e^{j2\pi\cdot(\Delta f_{P_1}-f)\cdot T_s})| \Leftrightarrow$$
$$|V_{p_1,demod,incoh,1}(e^{j2\pi\cdot(\Delta f_{P_1}-f)\cdot T_s})|^2 =$$
$$|V_{p_1,demod,incoh,1}(e^{j2\pi\cdot(\Delta f_{P_1}-f)\cdot T_s})|^2.$$

The properties Equation (3.77), Equation (3.80) and Equation (3.82) can now be employed for cancelling the voice signals from the spectrum. If only the magnitude spectrum shall be used for spectral subtraction, each users' signal component Equation (3.76) is frequency corrected to get $v_{p_1,demod,incoh,1}(k)$ as in Equation (3.81). As follows from Equation (3.82), it has a symmetric magnitude spectrum about the frequency zero and, therefore, a symmetric periodogram about the frequency zero. The advantage of spectral subtraction based on the magnitude spectrum is that the phase $\phi_{p_1}$ does not need to be estimated, only the frequency offset $\Delta f_{p_1}$ needs to be estimated, e.g. from the phase of the carrier of the DSB-AM signal.

The idea is now to estimate the frequency offset $\Delta f_{p_1}$ and, if not using the magnitude spectra only, the phase $\phi_{p_1}$ of each significant user and make use of the complex symmetry properties Equation (3.80) or, alternatively, Equation (3.77) or Equation (3.83), to cancel not only the carrier of each user as in the 2-step detector, but also to cancel the voiced sidebands. Cancellation of at least the voiced sidebands of the strongest user should be sufficient in order to make the carriers of lower power DSB-AM signals visible in the spectrum, and thus, detectable. The 'noise floor' that the pure peak detector observed is diminished by this approach, so that also users' signal components hidden in the voiced sidebands of other users become detectable and better detection results are achievable.

When using a DFT-related spectral estimate, the advantage of coherent demodulation is that the spectral samples of the DFT of each user demodulated by its carrier frequency are always symmetric and can be cancelled easily. If incoherent demodulation is used, the DFT samples of each user are only symmetric if the frequency of the peak of the users corresponds to the on-bin-case. It the frequency corresponds to an off-bin-case, the spectral samples need to be interpolated. Therefore, the frequency shift to an 'on-bin' frequency or a 'mid-bin' frequency, as done by demodulation of the receive signal with the carrier in the time domain, avoids interpolation, and the spectral samples can be directly subtracted.

That means that a shift by an arbitrary (integer) bin $\Delta_{p_1,int}$ can be performed, plus the inclusion of the fractional bin $\Delta_{p_1,frac}$, to achieve either the 'on-bin' case or the 'mid-bin' case. In the time domain, the following demodulation has to be performed:

$$\tilde{r}_w(k) = r_w(k) \cdot e^{-j2\pi\frac{\tilde{\Delta}_{p_1,frac}+\tilde{\Delta}_{p_1,int}}{N_{FFT}}k}\left(\cdot e^{-j\hat{\phi}_{p_1}}\right), \quad (3.84)$$

with $$\Delta_{p_1,frac} = \quad (3.85)$$

$$\begin{cases} \Delta\hat{f}_{p_1}\cdot T_s\cdot N_{FFT} - \text{round}(\Delta\hat{f}_{p_1}\cdot T_s\cdot N_{FFT}) & \text{for 'on-bin-case'} \\ \Delta\hat{f}_{p_1}\cdot T_s\cdot N_{FFT} - \\ (\text{round}(\Delta\hat{f}_{p_1}\cdot T_s\cdot N_{FFT}-0.5)+0.5) & \text{for 'mid-bin-case''} \end{cases}$$

where the integer bin part $\hat{\Delta}_{p_1,int}$ can be any integer number.

The phase correction in Equation (3.84) is not required if we work on magnitude spectra $|\tilde{R}_w(n)|$ instead of $\tilde{R}_w(n)$, with $\tilde{R}_w(n)=\text{DFT}_{N_{FFT}}\{\tilde{r}_w(k)\}$, where it is understood the $N_{FFT}$-DFT-Operator $\text{DFT}_{N_{FFT}}\{\cdot\}$ includes zero-padding of the sequence $\{\tilde{r}_w(k)\}_{k=0}^{N_{data}-1}$ by $N_{FFT}-N_{DFT}$ trailing zeros.

2-Step-Detector to Cancel Voiced Sidebands of DSB-AM Signals in the Frequency Domain Step 1:
Estimate frequency offset of the strongest peak. Optionally, if work on the complex spectral samples is intended, estimate also the phase of the strongest peak.

Step 2:
Demodulate the time domain signal by the estimated frequency offset. Optionally, if work on the complex spectral samples is intended, demodulate also with the phase. The sidebands of the voice components are conjugate symmetric about the frequency zero now.

Step 3:
Compute the difference spectrum between the spectral samples in positive bin direction and in negative bin direction. It is possible to estimate the spectral components directly, subtract only the magnitudes, or subtract the differences of the periodogram samples. Afterwards, the magnitude of the result should be computed, so that all spectral differences are positive (alternatively, negative for the negative magnitude). The strongest user has thus been cancelled, the second strongest user can be detected, e.g. by detecting its peak in the spectrum.

2-Step-Detector to Cancel Voiced Sidebands of DSB-AM Signals in the Time Domain

Step 1:
Estimate frequency offset of the strongest peak and the phase of the strongest peak.

Step 2:
Demodulate the time domain signal by the estimated frequency offset and rotate the complex phasor in the complex IQ-plane using the phase estimate of the carrier.

Step 3:
Cancel the strongest user signal using the projection operator Equation 3.9. This can be accomplished e.g. if in Step 2, the phase estimate is used to correct the carriers phase offset to zero, the projection is done by computing the imaginary part of the signal. The strongest user has thus been cancelled, the second strongest user can be detected, e.g. by detecting its peak in the spectrum.

4 Statistical Considerations: Computation of the Detector Threshold when Using the Projection Approach in the Spectral Domain The noise $n(k)=n'(k)+j\cdot n''(k)$ is assumed zero-mean circular symmetric white Gaussian with variance $E\{|n(k)|^2\}=\sigma_n^2=\sigma_{n'}^2+\sigma_{n''}^2$. The variance of its real- and imaginary part is one half of the variance of the complex noise:

$$\sigma_{n'}^2 = E\{|n'(k)|^2\} = \frac{\sigma_n^2}{2}, \sigma_{n''}^2 = E\{|n''(k)|^2 = \frac{\sigma_n^2}{2}\}, \quad (4.1)$$

$$k = 0, 1, \ldots, N_{data}-1.$$

Now, if the projection approach is used, we get:

$$P\{p^\perp n_{de\;mod}(k)\}=Im\{n(k)\cdot e^{-j\cdot(2\pi\cdot\Delta\hat{\gamma}^{(u)}\cdot k\cdot T_s+\hat{\phi}^{(u)})}\}=$$
$$Im\{\tilde{n}(k)\}, k=0,1,\ldots,N_{data}-1. \quad (4.2)$$

This means that the noise is demodulated by a complex rotation and than the imaginary part is taken. Rotation of a circular symmetric complex vector does not change its variance:

$$\sigma_{\tilde{n}''}^2 = E\{|\tilde{n}''(k)|^2\} = E\{|\text{Im}\{\tilde{n}(k)\}|^2\} = \frac{\sigma_n^2}{2}, \quad (4.3)$$

$$k = 0, 1, \ldots, N_{data} - 1.$$

the variance of the noise vector is divided by two, and the useful signal variance is also divided by two:

It can be shown that the samples of the $N_{data}$-DFT of a zero-mean circular symmetric Gaussian noise vector of length $N_{data}$ with variance $\sigma_n^2$ are independent zero-mean Gaussian random variables with variance $N_{data} \cdot \sigma_n^2$. The false alarm rate can be computed, provided that either no primary user is present or that the primary user is perfectly cancelled. In either case, under the $H_0$ hypothesis, the above noise vector is present.

$\tilde{n}(k)$ has the same variance as $n(k)$, because the rotation of a circular symmetric Gaussian random variable results in a Gaussian random variable with the same variance.

After spectral subtraction, the noise variance of the DFT-samples of the difference spectrum is doubled: $\tilde{\sigma}_n^2 = 2 \cdot \sigma_n^2$, because the subtraction of two independent Gaussian distributed random variable with zero mean and variance $\sigma_n^2$ each yields a Gaussian distribution with zero mean and the addition of the variances of the two samples, so $\tilde{\sigma}_n^2$. When performing e.g. a Neyman-Pearson test, the test statistic consists of the DFT samples.

Thus, the detection problem can be reformulated for the spectral subtraction $$H_0 : r_{clean,l}(k) = \tilde{n}(k), k =, 1, \ldots, N_{data} - 1, \quad (4.4)$$

$$H_1 : r_{clean,l}(k) = \quad (4.5)$$
$$\sum_{u=2}^{U} \left(1 + m^{(u)} \cdot s^{(u)}(k)\right) \cdot a^{(u)} \cdot e^{j \cdot \phi^{(u)}} \cdot e^{j \cdot 2 \cdot \pi \cdot \Delta f^{(u)} \cdot k \cdot T_s} + \tilde{n}k\Big),$$
$$U \geq 1, k = 0, 1, \ldots, N_{data} - 1.$$

Here, $r_{clean,1}(k)$ is the time domain signal where the primary DSB-AM user has been removed by any of the methods described above.

An appropriate test statistic $T(\Delta f^{(2)})$ is the periodogram $$\frac{1}{N_{data}} \left| \sum_{n=0}^{N_{data}-1} r_{clean,1}(k) \cdot e^{-j \cdot 2 \cdot \pi \cdot \Delta f^{(2)} \cdot k \cdot T_s} \right|^2. \quad (4.6)$$

The Generalized Likelihood Ratio Test (GLRT) for the search of the secondary user is $$\frac{f(\underline{r}; a^{(2)}, \Delta f^{(2)}, H_1)}{f(\underline{r}; H_0)} \begin{array}{c} H_1 \\ > \\ < \\ H_0 \end{array} \gamma, \quad (4.7)$$

where $\gamma$ is the threshold of the test.

The GLRT can be shown to be $$\max_{\Delta f^{(2)}} \frac{1}{N_{data}} \left| \sum_{k=0}^{N_{data}-1} r_{clean,1}(k) \cdot e^{-j \cdot 2 \cdot \pi \cdot \Delta f^{(2)} \cdot k \cdot T_s} \right|^2 \begin{array}{c} H_1 \\ > \\ < \\ H_0 \end{array} \ln(\gamma) \cdot 2 \cdot \tilde{\sigma}_n^2. \quad (4.8)$$

An appropriate test statistic for the computer is the discretized periodogram $T(n)$ $$T(n) = \frac{1}{N_{data}} \left| \sum_{n=0}^{N_{data}-1} r_{clean,1}(k) \cdot e^{\frac{j 2 \pi k n}{N_{data}}} \right|^2. \quad (4.9)$$

Under the $H_0$ hypothesis, the $N_{data}$-DFT of $r_{clean,1}(k) = \tilde{n}(k)$ consists of independent complex Gaussian noise samples with zero mean and variance $N_{data} \cdot \tilde{\sigma}_n^2 = N_{data} \cdot 2 \cdot \sigma_n^2$.

The GLRT using the DFT can be written $$\max_n T(n) \begin{array}{c} H_1 \\ > \\ < \\ H_0 \end{array} \ln(\gamma) \cdot 2 \cdot \tilde{\sigma}_n^2. \quad (4.10)$$

Ignoring the max-operation, the false alarm probability for each DFT bin is then with $\gamma' = \ln(\gamma) \cdot 2 \cdot \tilde{\sigma}_n^2$ $$P_{FA,bin} = Pr\{T(n) > \gamma'; H_0\} \quad (4.11)$$
$$= Pr\left\{\frac{T(n)}{\tilde{\sigma}_n^2} > \frac{\gamma'}{\tilde{\sigma}_n^2}; H_0\right\}$$
$$= Q_{\chi_2^2}\left(\frac{\gamma'}{\tilde{\sigma}_n^2}\right)$$
$$= \exp\left(\frac{\gamma'}{2 \cdot \tilde{\sigma}_n^2}\right), \gamma' = 2 \cdot \tilde{\sigma}_n^2 \cdot \ln(\gamma).$$

The Detection problem at hand is the detection of a DSB-AM signal in the difference spectrum. By computation of the difference spectrum, the noise power is doubled. The false alarm probability is determined by the detector bandwidth in bins, termed L. L corresponds to the number of bins where the spectral peak of the DSB-AM signal carrier might occur.

The probability of false alarm is computed $$P_{FA} = 1 - (1 - P_{FA,bin})^L \quad (4.12)$$

and, using Eq. (4.11), the threshold is computed $$\gamma' = 2 \cdot \tilde{\sigma}_n^2 \cdot (-1) \cdot \ln(1 - (1 - P_{FA,bin})^L) \quad (4.13)$$

The false alarm probability $P_{FA}$ can only be computed following Eq. (4.12) if no interpolation is used and no zero padding:

Using interpolation, the noise amplitude is slightly increased, and $P_{FA}$ is also increased.

Using zero padding, the noise samples are correlated, and the computation of $P_{FA}$ is complicated. $P_{FA}$ can be approximated using an additive small positive constant that depends on the zero padding factor in Eq. (4.11).

If the detector bandwidth is smaller than the FFT size, then, the detector bandwidth in Hz is the Nyquist frequency times L. If the maximum carrier frequency offset is larger than the Nyquist frequency, a peak might occur in the second Nyquist interval. It is then observed at the corresponding negative frequency of the Nyquist interval. If e.g. $f_s=8$ kHz, the Nyquist frequency is 4 kHz. If the carrier frequency offset is 4.1 kHz, the peak is observed at −3.9 kHz. This is not a problem, if not a second user occurs with said negative carrier frequency offset of −3.9 kHz.

To sum up:
If the detector bandwidth L can be diminished because the maximum possible carrier frequency offset is smaller than the Nyquist bandwidth, this should be done to decrease the false alarm probability.
If the detector bandwidth L exceeds the FFT size, then L should be fixed to the FFT size. Peaks occurring at frequency larger than the Nyquist frequency are detected without loss in detection probability, provided that not a second user has a frequency offset with negative frequency that is on the same position as the first user.

5 Detection of Double Transmissions in Multicarrier/Climax-Mode

If the detector for double-transmission receives such a CLIMAX signal made up of multiple spectrally shifted signal copies, it has to be designed to cope with them in so far that these multiple carriers, although transmitted from different transmitters, stem from only one user station and are thus not to be treated as double transmission. Thus, treating a CLIMAX signal as a double transmission would be a false alarm. This false alarm has to be avoided with high probability (i.e., occur with low probability): A CLIMAX signal shall not trigger the detector for double transmission. Therefore, the detector design has to take the CLIMAX signal into account, either by being robust to CLIMAX or by having the knowledge if and which CLIMAX mode is currently in use, and might possibly occur.

The detector shall trigger and thus, signal a double transmission with high probability:
  if both, a CLIMAX signal and at least one airborne user, are present. The CLIMAX signal is said to be present if at least one signal component is detected.
  two airborne users are present.
The detector shall not trigger:
  if only one CLIMAX signal (with noise) is present, represented by a least one CLIMAX signal component.
  if only one airborne user (with noise) is present.
  If only noise is present.
There are CLIMAX-modes that have a signal copy present at the nominal carrier frequency (case A), and there are others that have no copy present (case B). E.g., the 3 and 5 carrier CLIMAX mode belong to case A, they have a signal component in the middle partial frequency band, whereas the 2 and 4 carrier CLIMAX modes belong to case B in Table 2.3.

Our approach to keep Multicarrier/CLIMAX-transmission from triggering the detector is:
  To use the knowledge about different spectral occupation of the CLIMAX signal copies compared to non-CLIMAX components: Non-CLIMAX transmissions are always received close to the nominal carrier frequency, whereas CLIMAX signals have known frequency offsets from the carrier, as outlined above in Table 2.3, and can be separated spectrally by filtering.
  Distinguishing CLIMAX- from non-CLIMAX-transmission by spectral separation has to take into account if a CLIMAX-mode that belongs to case A (signal copy present at nominal carrier frequency) is possible, or not.
  If yes:
  If a CLIMAX-mode that has a spectral copy at the nominal carrier frequency $f_c$ might be transmitted by a ground station. This is the case for 3 and 5 carrier CLIMAX, see Table 2.3. If the transmitted spectral copy can be received with sufficient signal power, the detector cannot distinguish this CLIMAX signal copy from an airborne user's signal that might also be received close to nominal carrier frequency $f_c$. To solve this problem, if 3 or 5 carrier CLIMAX is transmitted, it should be configurable by the user if:
    CASE 1: at least two signal copies need to be detected close to the nominal carrier frequency (1 CLIMAX and 1 airplane, or two airplanes)
    CASE 2: one signal needs to be detected close to the nominal carrier frequency
  and a pilot signal lies in the spectral separation of CLIMAX and non-CLIMAX transmission Our way not to detect CLIMAX as a double transmission lies in the limited frequency error of each CLIMAX transmitter; all spectral copies of a CLIMAX signal can be well separated spectrally. Thus, a detection of a carrier in a certain band can be linked to an airborne user, a CLIMAX signal component, or, sometimes, to both.

Now, our idea is to compute the frequency limits that can occur in the worst case. These frequency limits might be calculated assuming a maximum allowed Doppler frequency and taking into account the maximum frequency offset ratings possible, e.g. those standardized in the ETSI norm [ETSI300676-1] (Electromagnetic compatibility and Radio spectrum Matters (ERM); Ground-based VHF hand-held, mobile and fixed radio transmitters, receivers and transceivers for the VHF aeronautical mobile service using amplitude modulation; Part 1: Technical characteristics and methods of measurement, ETSI EN 300 676-1 V1.4.1 (2007-04)). In any case, some spectral guard bands should be included in order to prevent radios from slightly exceeding these limits from triggering the detector for double transmission. Thus, taking into account the frequency offsets, valid frequency bands can be computed where a spectral copy might occur, and other bands, where a copy might not occur. Now, a detector working in the frequency domain can work only on these valid bands.

Having computed valid frequency bands, the users can be separated by filtering out the bands that are valid for the individual CLIMAX mode, and performing feature detection in theses filtered bands. When filtering, the filter at the nominal carrier frequency has to be computed taking into account the worst case frequency offset of the mobile user, which is larger than the carrier frequency offset of the ground station. The other filters can be computed from the maximum frequency offset ratings [ETSI300676-1].

5.1 If CLIMAX/Multicarrier is Signalled to the Detector:

We propose some strategies for the detection of a double transmission, when the exact CLIMAX/Multicarrier mode is signalled to the detector.

We start with low complexity strategies that are suboptimum in so far that the detection interval covers only a limited numb.

The procedure leading to decision about a double transmission can be the following:
Case A:
  Step 1: Detect the strongest user within the partial frequency band $I_{R1}$ around the carrier frequency, so after down-conversion to baseband, around the frequency zero. Test if this signal component is significant, e.g. by estimating its power or the magnitude of its peak above the noise floor. Search for a second strongest user inside the Nyquist band. Either subtract the peak spectrally, so that an AM signal without carrier is present with noise. Alternatively, the signal can be demodulated to zero frequency, followed by spectral subtraction of the sidebands. For this, the frequency peak detector above can be used. If there is a user signal present, a spectral subtraction can be performed to search for the second user. If a significant second signal is found within this band, a double transmission is decided for.

Note: Under regular circumstances, the detected signals can either be two mobile users or a mobile user and a ground station.

Step 2: Optionally, to cover the case that the copy of the CLIMAX signal within middle partial frequency band is to weak due to fading, the signal in this band can be frequency compensated by its frequency offset, and be cross-correlated with the also frequency offset compensated second strongest CLIMAX signal copy present. For this, the spectrum has to be searched for a significant second user outside the middle partial frequency band. If both are uncorrelated, the signal detected first around frequency zero is not a CLIMAX signal component, but belongs to an interferer, and the detector shall trigger. If both signals are correlated, they are both CLIMAX signal copies, and the detector shall not trigger. During the correlation, several lags have to be tested, because the signal copies within each CLIMAX partial band can be temporally shifted, because the stem from different transmitters at different geographical positions. This concludes the test. This optional additional comparison between signal components in different partial frequency bands improves the detection performance.

Case B:

Step 1: Perform Step 1 as under "Case A". The same holds here, so if there is more than one user, within this partial frequency band, the detector decides for a double transmission.

Note: Under regular circumstances, the detected signals can only be two mobile users, because in this CLIMAX mode, the ground station has no signal copy in the partial frequency band around zero.

Step 2: If a single significant user is found in the partial frequency band around frequency zero, it stems from a single mobile user, because for Case B, CLIMAX has no component in this band. An interference of this mobile user with a possible CLIMAX signal is to be tested. To achieve this, the remaining partial frequency bands have to be checked for significant signal components. This can be achieved by testing in all remaining partial frequency bands the largest user signal, alternatively the largest spectral component for significance, or perform another suitable feature detection to distinguish climax signal copies from the noise in these partial frequency bands.

Note that all non-CLIMAX modes, where no multiple carriers are used, are similar to case A, only that the additional copies are missing. Non-CLIMAX modes can therefore be treated described in Case A without performing step 2. The initial limitation to a partial frequency band improves the detection performance by eliminating those false alarm detections based on spectral components outside the maximum frequency ratings stated in [ETSI300676-1].

5.2 If CLIMAX/Multicarrier is not Signalled to the Detector: CLIMAX Auto Detection If the CLIMAX/Multicarrier mode cannot be signalled to the detector, or if the interference from other CLIMAX/Multicarrier stations is severe, the detection of interferers is still possible. This mode is termed CLIMAX Auto detection not because the mode is estimated, but because detection of an interferer can still be performed.

The procedure is as follows:

Step 1: Perform Step 1 as under "Case A". The same holds here, so if there is more than one user, within the partial frequency band around the frequency zero, the detector decides for a double transmission. If there is no such user, then decide against a double transmission. If there is only a single user, then proceed with Step 2 below.

Note: The detected signals can be two mobile users, two close ground stations with a bad frequency planning having a CLIMAX mode with signal copy at the partial frequency band around zero (case A), or a mixture of mobile stations and ground station having partial frequency band around zero (case A).

Step 2: Perform a procedure similar to Case B, Step 2: An interference of the signal component detected in the partial frequency band round zero frequency with a possible CLIMAX signal is to be tested. To achieve this, the remaining possible frequency bands have to be checked for significant signal components. Here, the remaining possible frequency bands are those that can be covered by a signal copy present in any possible CLIMAX mode. The test can be achieved by testing in all remaining possible partial frequency bands the largest user signal, alternatively the largest spectral component on significance in these bands, or perform another suitable feature detection to distinguish climax signal copies from the noise in these partial frequency bands. An easier, but slightly worse approach is to ignore all remaining partial frequency band limits and just search outside the partial frequency band around zero frequency offset error. If no significant user is detected in these remaining partial frequency bands, the detector decides for no interference present. If there is a significant user signal detected, then proceed to step 3.

Step 3: It is still unknown if the additional signal component found in the remaining partial frequency bands belongs to a CLIMAX signal of case A. To find out, the additional signal component is spectrally shifted to zero frequency, and cross-correlated with the spectrally demodulated primary signal detected in step 2. If the correlation is larger than a value that depends on the false alarm probability, the detector decides for double transmission present, otherwise against it.

Note: Spectral transformations (Fourier) and filtering are linear operators. As such, their order can be interchanged: Instead of first filtering out the partial frequency bands and then performing individual DFT-operations, the DFT can be done first, and then the 'filtering' is done by observing only certain bin indices as subbands. Therefore, the partial frequency bands can be computed from a filter that has a bandwidth large enough to see all CLIMAX components. The filtering is then done spectrally by observing signals between various frequency components that can be computed. This approach has the following advantages:

1) Only a single lowpass filter is required that covers the full bandwidth of interest, including CLIMAX components. Filtering first, however, requires multiple filters in order to separate the partial frequency bands.

2) Only a single DFT is required to produce the spectrum. Additional DFT might be required only for the difference spectrum computation, if desired.

3) The approach with a single filter allows an easy reconfiguration in hardware or software, because not multiple filters need to be computed, and there is only one structure. Between different CLIMAX modes, the only changes are in the decision logic and in the detection and decision process at the end of the chain.

If, however, the received signal is processed in a nonlinear fashion as in [LIPP10], before using spectral transformations, such as the linear DFT-Operation, the partial frequency bands have to be filtered out of the input signal first, so before the DFT-Operation. The reason is that the nonlinearity generates spectral lines outside the partial frequency band where the original signal resides. Therefore, nonlinear pre-processing requires a filtering of the partial frequency bands by individual filters, leading to increased computation requirements to perform the filtering.

6 Differentiating Airborne Double Transmissions from Mixed Airborne-Ground Station Caused Double Transmission by Masking of Events As already mentioned in the introductory chapter, it is interesting to know as to whether a double transmission is caused by (at least) two airborne users (case A) or a transmission including a ground station (case G). The reason is that if the ground user interferes with an airborne user, the airborne user might notice this more easily, because he gets no response on his message. Also, this case occurs quite often and is not so hazardous as if two airborne users interfere.

Hence, according to an embodiment a receiver, detecting double transmission and signalling in response hereto a double transmission event to the VCS control center, is extended within the VCS by a unit named Event Masking Logic (EML) that combines the information that a double transmission has been detected with the information that a ground radio is currently transmitting which (at least likely) causes the double transmission.

A differentiation can be easily achieved by considering that in case G, there was an active transmission from a radio at the ground station while at the same time, at least one receive radio (receiver) detected a double transmission. If a receiver has detected a double transmission during the active transmission of the ground station, this additional information is present in the VCS. Thus, this information can be used to mask all double transmission events that occurred during or slightly after a transmission from a ground station radio connected to the VCS. Accordingly, in an embodiment the EML is adapted for signaling the event to a controller, in particular an Air Traffic Controller which in response hereto issues an operator observable signal, e.g. an acoustic and/or visual signal.

Figure 4:
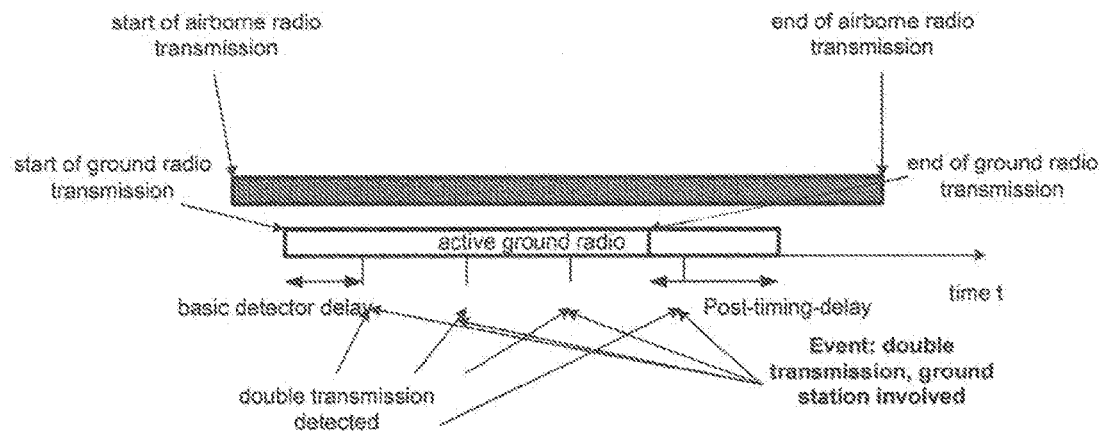
FIG. 4 shows an example of masking of a double transmission caused by a transmission by a ground station.

FIG. 4 shows an example of masking of a double transmission caused by a transmission by a ground station (ground radio transmission).

Event: A double transmission is detected, but due to the concurrent transmission of the ground station (overlapping in time t with the transmission of the airborne transmission (referred to as airborne radio 1 transmission in FIG. 4) it can be assumed and is determined by the EML that an airborne-based double transmission did not take place.

Figure 5:
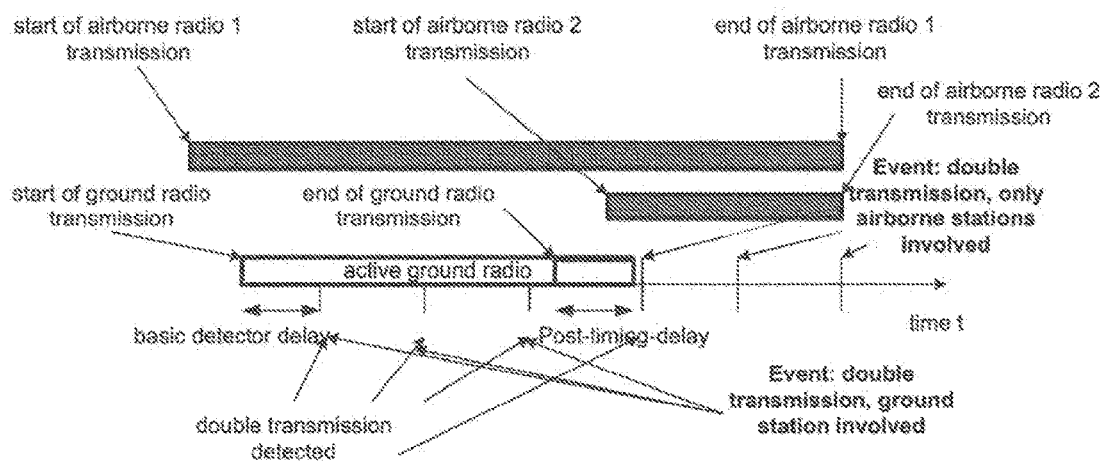
FIG. 5 shows an example of a masked double transmission caused by a ground radio, followed by a double transmission caused only by at least two airborne users.

FIG. 5 shows an example of a masked double transmission caused by a ground radio, followed by a double transmission caused only by at least two airborne users:

First Event: A double transmission is detected, an airborne-based double transmission is not detected because the double transmission occurs due to the concurrent transmission of the ground station.

Second Event: A double transmission is detected, an airborne-based double transmission is also detected since after the end of the emission of the ground station only transmissions of airborne stations (i.e. airborne transmissions) are involved.

It is important to know that the time axis is in reference to the location of the event masking mechanism within the VCS. It will be typically located in the VCS network at a means that is able to interface both the transmitting ground radio as well as the receiving radios equipped with the basic double transmission detector.

Figure 6:
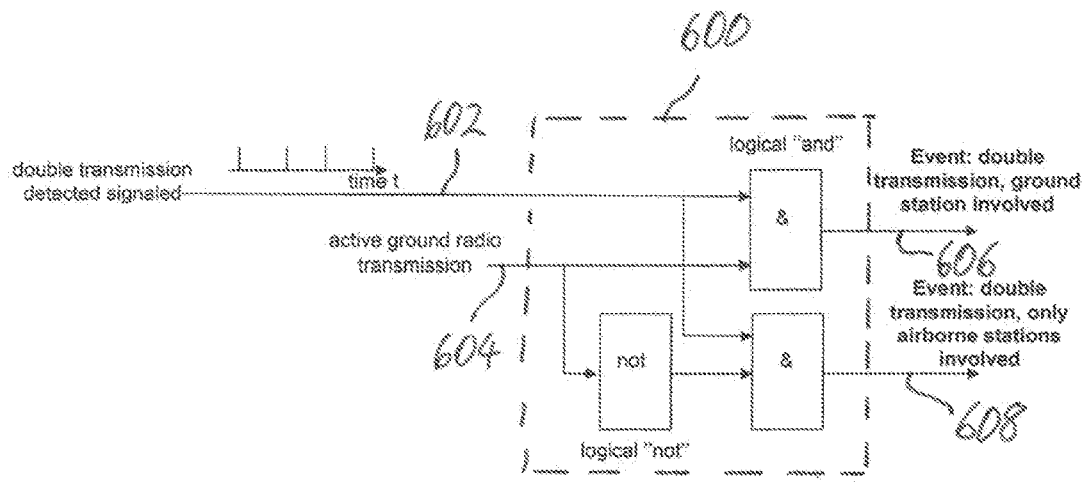
FIG. 6 shows schematically an Event Masking Logic.

A schematic of the Event Masking Logic 600 (EML) is shown in FIG. 6.

The input signals "double transmission detected" 602 from a receiver (e.g. a receiving ground station) and "active ground radio transmission" 604 are known to the VCS network.

Both signals might be time aligned at the inputs or delayed to suit the algorithm's detection performance. For example, an off-delay timer (not shown in FIG. 6) is on for the fixed period of time, the post-timing delay, after the "active ground radio transmission" input signal has already turned off. It is needed to align the two input signals if the basic double transmission detector needs a time so long for detection that the ground radio transmission is already over. In accordance with embodiments of the herein disclosed subject matter, the EML 600 is adapted for outputting a first output signal 606 indicating the event of a double transmission with a ground station involved if the active ground radio transmission signal 604 indicates that there is an active ground radio transmission and for outputting a second output signal 608 indicating the event of a double transmission where only airborne stations are involved if the active ground radio transmission signal 604 indicates that there is no active ground radio transmission.

The Event Masking Logic can be located at the Controller Working Position (CWP) or elsewhere in the VCS network a means suitable the capture the signals from a receive radio signaling "double transmission detected" and having the information of an active ground radio transmission.

Figure 7:
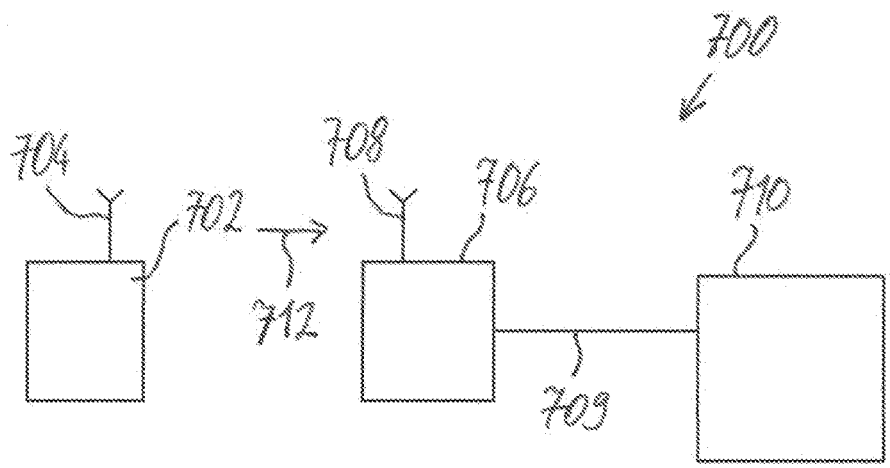
FIG. 7 shows a communication system.

FIG. 7 shows a communication system 700 according to embodiments of the herein disclosed subject matter.

The communication system 700 comprises a transmitter 702 with at least one transmit antenna 704 and a receiver 706 with at least one receive antenna 708. The receiver may be part of a receiving ground station and is, in accordance with an embodiment, communicatively coupled, 709, to a controller 710, e.g. to a Air traffic control. According to an embodiment, the communication system 700 is a voice communication system (VCS). Accordingly, in an embodiment, a signal 712 transmitted by the transmitter 702 to the receiver 706 is a Double Side-Band full carrier Amplitude Modulated (DSB-AM) voice signal. However, it should be understood that such a signal type is only used in an exemplary implementation of the herein disclosed subject matter where embodiments disclosed herein are useful. However, a person skilled in the art will readily recognize that the herein disclosed subject matter is applicable to numerous other situations.

It should further be noted that a processing chain, a controller or a receiver as disclosed herein is not limited to dedicated entities as described in some embodiments.

Rather, the herein disclosed subject matter may be implemented in various ways and in various granularity while still providing the specified functionality.

According to embodiments of the invention, any suitable entity (e.g. components, units and devices) disclosed herein, e.g. the units described with regard to FIG. 2 and FIG. 3, are at least in part provided in the form of respective computer programs which enable a processor device to provide the functionality of the respective entities as disclosed herein. According to other embodiments, any suitable entity disclosed herein may be provided in hardware. According to other—hybrid—embodiments, some entities may be provided in software while other entities are provided in hardware.

It should be noted that any entity disclosed herein (e.g. components, units and devices) are not limited to a dedicated entity as described in some embodiments. Rather, the herein disclosed subject matter may be implemented in various ways and with various granularity on device level and/or software module level while still providing the specified functionality. Further, it should be noted that according to embodiments a separate entity (e.g. a software module, a hardware module or a hybrid module) may be provided for each of the functions disclosed herein. According to other embodiments, an entity (e.g. a software module, a hardware module or a hybrid module (combined software/hardware module)) is configured for providing two or more functions as disclosed herein. According to still other embodiments, two or more entities (e.g. part, portion, surface, component, unit, structure or device) are configured for providing together a function as disclosed herein.

According to an embodiment, the controller comprises a processor device including at least one processor for carrying out at least one computer program product or program element which may correspond to a respective software module.

It should be noted that the term "comprising" does not exclude other elements or steps and the "a" or "an" does not exclude a plurality. Also elements described in association with different embodiments may be combined. It should also be noted that reference signs in the claims should not be construed as limiting the scope of the claims.

Further, it should be noted that while the exemplary processing chains in the drawings include a particular combination of several embodiments of the herein disclosed subject matter, any other combination of embodiment is also possible and is considered to be disclosed with this application.

In summary, the herein disclosed subject matter includes in particular the following embodiments:

1. Method for the detection of more than one signal contained in a receive signal as described under "a 2-step procedure for detection of widely spaced DSB-AM", where the signal is down-converted using the carrier frequency offset of the strongest user contained in the receive signal, whereby the strongest user is cancelled using a projection approach in the time domain, allowing for the detection of a possible secondary user.

2. Method following embodiment 1, whereby, except for the down-conversion sing the carrier frequency offset of the strongest user, only linear operations are carried out prior to the cancellation in the time or frequency domain.

3. Method using at least one of embodiments 1 or 2, where the receive signals contains a carrier signal component in an amplitude modulated signal.

4. Method using at least one of embodiments 1 to 3, where the strongest user allows for its cancellation thanks to its real-valuedness, so that it can be interpreted as a straight line in the complex inphase-quadrature (IQ) plane.

5. Method using at least one of embodiments 1 to 4, where the signal rest after cancellation of the strongest user allows a user to judge in favor or against of at least one additional secondary, weaker user.

6. Method using at least one of embodiments 1 to 5, where the means for judging for or against at least a secondary user is automated by a statistical test.

7. Method using at least one of embodiments 1 to 6, where the statistical test is a statistical test for the presence of cyclo-stationary in the signal rest, or a harmonic detector in noise on the signal rest, or a non-circularity test.

8. Method for the detection of more than one signal contained in a receive signal as described under "2-Step-Detector to Cancel Voiced Sidebands of DSB-AM In The Frequency Domain", where the signal is down-converted using the carrier frequency offset of the strongest user contained in the receive signal, whereby the strongest user is cancelled using a subtraction of the conjugate symmetric sidebands of the Fourier transform of the signal in the frequency domain, allowing for the detection of at least one possible secondary user; or Method for the detection of more than one signal contained in a receive signal as described under "Refined 2-Step-Detector to Cancel Voiced Sidebands of DSB-AM In The Time Domain", where the signal is down-converted using the carrier frequency offset of the strongest user contained in the receive signal, whereby the strongest user is cancelled using a subtraction of the conjugate symmetric sidebands of the Fourier transform of the signal in the frequency domain, allowing for the detection of at least one possible secondary user.

9. Method following embodiment 8, whereby, except for the down-conversion sing the carrier frequency offset of the strongest user, only linear operations are carried out prior to the subtraction of the sidebands in the frequency domain, where the symmetric sidebands are cancelled.

10. Method following at least one of embodiments 8 or 9, whereby the sidebands of a periodogram are subtracted in the frequency domain.

11. Method following at least one of embodiments 8 to 10, whereby the sidebands of a magnitude spectrum are subtracted in the frequency domain.

12. Method for the detection of more than one signal contained in a receive signal as described under "2-Step-Detector to Cancel Voiced Sidebands of DSB-AM In The Time Domain", where the signal is down-converted using the carrier frequency offset of the strongest user contained in the receive signal, whereby the strongest user is cancelled using a projection approach in the time domain, allowing for the detection of at least one possible secondary user.

13. Method following embodiment 12, whereby, except for the down-conversion sing the carrier frequency offset of the strongest user, only linear operations are carried out prior to the cancellation using a projection approach in the time domain.

14. Method following at least one of the preceding embodiments, whereby the signal after cancellation of the strongest user in the time domain or frequency domain is tested for additional CLIMAX users in their respective frequency bands.

15. Method for the detection of different double transmission events by combining the basic detection of double transmissions with additional information present within the VCS, in particular in combination with at least one of embodiments 1 to 14.

16. Method following embodiment 15, for the detection of the event that only airborne users are involved in a double transmission by a means that combines the information "double transmission detected" and "active ground radio transmission" by using logic combining of the signals present within the VCS.

17. Method following embodiment 16, that signals the event to the Air Traffic Controller by a suitable means (acoustic, visual or other).

18. Method following embodiment 15, for the detection of the event that a ground station is involved in a double transmission by a means that combines the information "double transmission detected" and "active ground radio transmission" by using logic combining of the signals present within the VCS.

19. Method following embodiment 18, that signals the event to the Air Traffic Controller by a suitable means (acoustic, visual or other).

20. Detection of CLIMAX signals by detection of the spectral peaks caused by a DSB-AM carrier, as described in chapter 5.1.

21. Detection of CLIMAX signals by detection of the spectral peaks caused by a DSB-AM carrier, as described in chapter 5.2.

Further, in order to recapitulate some of the above described embodiments of the present invention one can state:

Disclosed is a method for the detection of more than one signals contained in a receive signal, the method comprising: down-converting the receive signal, thereby providing a down-converted signal in a complex IQ base band; at least partially cancelling the strongest user in the down-converted signal, thereby allowing for the detection of a possible secondary user (e.g. Down-converting the receive signal by either the frequency-offset of the strongest user to zero frequency or by a frequency that lets the carrier of the strongest user reside on a frequency bin or in between two frequency bins).

LITERATURE

[STO05] P. Stoica, R. Moses, "Spectral Analysis of Signals," Prentice Hall, Upper Saddle River, New Jersey, 2005.

[RM01] R. Martin, "Noise Power Spectral Density Estimation Based on Optimal Smoothing and Minimum Statistics,"*IEEE Transaction on speech and audio processing*, Vol. 9, No. 5, July 2001.

[WHA71] A. D. Whalen, "Detection of Signals in Noise," Academic Press, New York, 1971.

[ETSI300676-1] Electromagnetic compatibility and Radio spectrum Matters (ERM); Ground-based VHF hand-held, mobile and fixed radio transmitters, receivers and transceivers for the VHF aeronautical mobile service using amplitude modulation; Part 1: Technical characteristics and methods of measurement, ETSI EN 300 676-1 V1.4.1 (2007-04).

[ANNEX10] ANNEX 10 to the Convention on International Civil Aviation Aeronautical Telecommunications, Volume III, $2^{nd}$ edition 2007, part 2: voice communications systems, including amendment 85.

[ANNEX10prop] Luc Deneufchätel and Jacky Pouzet, "Annex 10 amendments to cover Climax operation on DSB-AM with 8.33 kHz channel spacing", AERONAUTICAL COMMUNICATIONS PANEL (ACP), Working Group M (ACP WG-M), Montreal, Canada, 2006.

[Lipp10] Friedrich Lipp, "Method and device for detecting simultaneous double transmission of AM signals", US patent No. 2010/0067570 A1, published Mar. 18, 2010.

[Yang08] Bin Yang, "A Study Of The Inverse Short Fourier Transform," *Proc. Acoustics, Speech and Signal Processing*, 2008. *ICASSP* 2008. *IEEE International Conference on*, pp. 3541-3544, Mar. 31, 2008-Apr. 4, 2008.

[Schou92] J. Schoukens, R. Pintelon, H. van Hamme, "The interpolated Fast Fourer Transform: A comparative study, "*IEEE Transaction on instrumentation and measurement*, Vol. 41, No. 2, April 1992.

[Kay89] S. M. Kay, "A fast and accurate single frequency estimator", *IEEE Transactions on Acoustics, Speech and Signal Processing* 37, 1987}1990.

[Ume06] S. Umesh, D. Nelson, "Computationally Efficient Estimation of Sinusoidal Frequency at Low SNR", *Proceedings of the 1996 IEEE International Conference on Acoustics Speech and Signal Processing*, Atlanta (Ga.), 2797}2800.

The invention claimed is:

1. A method for the detection of more than one signals contained in a receive signal, the method comprising:
   down-converting the receive signal, thereby providing a down-converted signal in a complex inphase-quadrature (IQ) base band; and
   at least partially cancelling a strongest user in the down-converted signal, thereby allowing for the detection of a possible secondary user;
   wherein the strongest user is at least partially cancelled by
   (i) using a projection approach in the time domain; or,
   (ii) using a subtraction of conjugate symmetric sidebands of a Fourier transform of the down-converted signal in the frequency domain.

2. The method according to claim 1, wherein, before the strongest user is at least partially cancelled by using the projection approach, the down-converting of the receive signal is performed by using the carrier frequency offset of the strongest user contained in the receive signal such that in the base band the carrier of the strongest user is at zero frequency.

3. The method according to claim 2, whereby except for complex mixing by a frequency offset or fractional frequency offset only linear operations are carried out prior to the cancellation in the time domain.

4. The method according to claim 2, where the receive signals contains a carrier signal component in an amplitude modulated signal.

5. The method according to claim 2, where the strongest user is cancelled based on its real-valuedness, where the real-valuedness allows to interpret the strongest user as a straight line in the complex inphase-quadrature (IQ) plane.

6. The method according to claim 1, wherein, before the strongest user is at least partially cancelled using the subtraction, the down-converting of the receive signal is performed such that in the base band the carrier of the strongest user resides on a Discrete Fourier Transform frequency bin or between two Discrete Fourier Transform frequency bins.

7. The method according to claim 6, whereby except for complex mixing by a frequency offset or fractional frequency offset only linear operations are carried out prior to the subtraction of the sidebands in the frequency domain, where the symmetric sidebands are cancelled.

8. The method according to claim 6,
   whereby the sidebands of a periodogram are subtracted in the frequency domain; and/or whereby the sidebands of a magnitude spectrum are subtracted in the frequency domain.

9. The method according to claim 1, wherein the at least two signals contained in the receive signal are Double Side-Band full carrier Amplitude Modulated signals.

10. The method according to claim 1, wherein the more than one signals are analogue modulated signals.

11. A method for the detection of different double transmission events by combining a detection of more than one signal contained in a receive signal received by a receiver of a communication system, with additional information present within the communication system;
wherein the different double transmission events include (i) an event that a ground station is involved in a double transmission, or (ii) an event that only airborne users are involved in a double transmission;
wherein the detection of more than one signal contained in a receive signal comprises:
down-converting the receive signal, thereby providing a down-converted signal in a complex inphase-quadrature (IQ) base band; and
at least partially cancelling the strongest user in the down-converted signal, thereby allowing for the detection of a possible secondary user; and
wherein the detection of the event that only airborne users are involved in a double transmission is performed by combining an information "double transmission detected" and "active ground radio transmission" by using logic combining of the signals present within the communication system; or
wherein the detection of the event that a ground station is involved in a double transmission is performed by combining an information that a secondary user is detected in a time interval with the information that an active ground radio transmission occurred in the time interval.

12. The method according to claim 11, wherein the detection of the event that only airborne users are involved in a double transmission further comprises signaling the event to a controller, in particular an Air Traffic Controller which in response hereto optionally issues an operator observable signal, in particular by a suitable means, in particular by acoustic means, visual means, or other means.

13. The method according to claim 11, wherein the detection of the event that a ground station is involved in a double transmission is performed by using logic combining signals present within the communication system.

14. A receiver of a communication system, being configured for receiving a receive signal comprising a controller for the detection of more than one signals contained in the receive signal;
the controller being configured for down-converting the receive signal, thereby providing a down-converted signal in a complex inphase-quadrature (IQ) base band; and
the controller being configured for at least partially cancelling a strongest user in the down-converted signal, thereby allowing for the detection of a possible secondary user; and
the controller being configured for at least partially cancelling the strongest user by
(i) using a projection approach in the time domain; or,
(ii) using a subtraction of conjugate symmetric sidebands of a Fourier transform of the down-converted signal in the frequency domain.

* * * * *

UNITED STATES PATENT AND TRADEMARK OFFICE
CERTIFICATE OF CORRECTION

PATENT NO. : 9,825,794 B2  
APPLICATION NO. : 14/900940  
DATED : November 21, 2017  
INVENTOR(S) : Thuy Duong Nguyen Page 1 of 1

It is certified that error appears in the above-identified patent and that said Letters Patent is hereby corrected as shown below:

In the Specification

Column 14, Line 28   Delete: "$e^{j \cdot 2 \cdot \pi \cdot \left( \Delta f^{(u_{\max})} - \hat{f}^{(u_{\max})} \right) \cdot k \cdot T_s}$"

Insert: --$e^{j \cdot 2 \cdot \pi \cdot \left( \Delta f^{(u_{\max})} - \Delta \hat{f}^{(u_{\max})} \right) \cdot k \cdot T_s}$--

Column 31, Line 52   Delete: "$\cdot \underline{P}^{\perp}_{\underline{d}(\Delta \hat{f}_{p_1})} (\Delta \hat{f}_{p_1}) \cdot \underline{r} = DTFT_{N_{data}} \left\{ \underline{P}^{\perp}_{\underline{d}(\Delta \hat{f}_{p_1})} (\Delta \hat{f}_{p_1}) \cdot \underline{r} \right\}$"

Insert: --$\underline{d}^H(f) \cdot \underline{P}^{\perp}_{\underline{d}(\Delta \hat{f}_{p_1})} (\Delta \hat{f}_{p_1}) \cdot \underline{r} = DTFT_{N_{data}} \left\{ \underline{P}^{\perp}_{\underline{d}(\Delta \hat{f}_{p_1})} (\Delta \hat{f}_{p_1}) \cdot \underline{r} \right\}$--

Signed and Sealed this  
Thirteenth Day of November, 2018

Andrei Iancu  
*Director of the United States Patent and Trademark Office*